United States Patent
Asami et al.

(10) Patent No.: US 8,507,603 B2
(45) Date of Patent: *Aug. 13, 2013

(54) SOLVENT DISPERSION OF COMPOSITE RESIN AND USES THEREOF

(75) Inventors: Keiichi Asami, Sodegaura (JP); Kunihiko Takeuchi, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 12/926,267

(22) Filed: Nov. 5, 2010

(65) Prior Publication Data

US 2011/0054118 A1  Mar. 3, 2011

Related U.S. Application Data

(63) Continuation of application No. 10/556,504, filed as application No. PCT/JP2004/006316 on Apr. 30, 2004, now Pat. No. 7,879,950.

(30) Foreign Application Priority Data

May 13, 2003 (JP) ................................ 2003-133830

(51) Int. Cl.
*A61K 9/16* (2006.01)
*C08L 23/12* (2006.01)

(52) U.S. Cl.
USPC .......................................... 524/543; 524/582

(58) Field of Classification Search
USPC ....................................................... 524/543
See application file for complete search history.

(56) References Cited

U.S. PATENT DOCUMENTS

| | | | |
|---|---|---|---|
| 3,579,485 A | 5/1971 | Folzenlogen et al. | |
| 4,299,754 A | 11/1981 | Shiomi et al. | |
| 4,877,841 A | 10/1989 | Moriya et al. | |
| 5,059,658 A | 10/1991 | Sezume et al. | |
| 6,191,210 B1 * | 2/2001 | Rosch et al. | 524/533 |
| 6,306,931 B1 | 10/2001 | Ferguson | |

FOREIGN PATENT DOCUMENTS

| | | |
|---|---|---|
| EP | 0 560 496 A1 | 9/1993 |
| JP | 50-10916 | 4/1975 |
| JP | 58-071966 A | 4/1983 |
| JP | 59-027968 A | 2/1984 |
| JP | 62-21027 B2 | 5/1987 |
| JP | 63-012651 A | 1/1988 |
| JP | 64-036614 A | 2/1989 |
| JP | 01-123812 A | 5/1989 |
| JP | 01-131220 A | 5/1989 |
| JP | 02-269109 A | 11/1990 |
| JP | 9-165489 A | 6/1997 |
| JP | 2000-500507 A | 1/2000 |
| JP | 2003-345098 A | 12/2000 |
| JP | 2001-311036 A | 11/2001 |
| TW | 527404 B | 4/2003 |
| WO | WO 02/055598 A1 | 7/2001 |

* cited by examiner

*Primary Examiner* — Hui Chin
(74) *Attorney, Agent, or Firm* — Buchanan Ingersoll & Rooney PC

(57) ABSTRACT

A solvent dispersion of a composite resin which comprises a solvent and a composite resin comprising a thermoplastic elastomer (A) and a polymer of copolymerizable monomers (B) comprising a monomer having an $\alpha,\beta$-monoethylenically unsaturated group and other copolymerizable monomer(s), wherein the thermoplastic elastomer (A) is a propylene-based elastomer having a molecular weight distribution (Mw/Mn) of not more than 3 as measured by gel permeation chromatography (GPC), and the copolymerizable monomers (B) include at least one monomer containing no functional groups; and uses of the dispersion. The dispersion can be used to provide a coating material, primer, adhesive, additive, binder, film, and primer for strippable paints and traffic paints, which have excellent adhesiveness to various materials.

34 Claims, No Drawings

SOLVENT DISPERSION OF COMPOSITE RESIN AND USES THEREOF

CROSS-REFERENCE TO RELATED APPLICATIONS

This application is a continuation of application Ser. No. 10/556,504, filed Jun. 9, 2006, which was the National Stage filing under §371 of PCT/JP2004/006316, filed Apr. 30, 2004, which in turn claims priority to Japanese Application No. 2003-133830, filed May 13, 2003, the entire content of each of which is incorporated herein by reference.

FIELD OF THE INVENTION

The present invention relates to a solvent dispersion of a composite resin, which comprises a solvent and a composite resin comprising a thermoplastic elastomer (A) and a polymer of copolymerizable monomers (B) comprising a monomer having an α,β-monoethylenically unsaturated group and other copolymerizable monomer(s), and uses thereof.

More specifically, the invention relates to a solvent dispersion of a polyolefinic composite resin, which is useful as a coating material and a primer for untreated polyolefin resin films, sheets, molded products or the like, or as an adhesive, an additive, a binder, a film, a primer for strippable paints and traffic paints, or the like, when formed into a coating film.

BACKGROUND ART

Conventionally, polyolefinic resins have in general many advantages such as good productivity, excellent moldability in accordance with various molding techniques, light weight, anti-rust property, impact resistance and the like, and thus have been used in a wide range of applications such as interior or exterior decorations for automobiles, ships or the like, materials for domestic appliances, furniture, miscellaneous goods and construction, and the like.

Since such molded products of polyolefinic resins are generally non-polar as well as crystalline, unlike those polar synthetic resins represented by polyurethane resins, polyamide resins, acrylic resins and polyester resins, it is extremely difficult to perform coating or adhesion to these polyolefinic resins using a general-purpose resin composition.

For this reason, when coating or adhesion is carried out onto a polyolefinic resin molded product, it has been traditional to enhance adherence onto the product surface by treating the surface with a primer or by activating the surface. For example, in the case of an automobile bumper, desired coating or adhesion has been carried out after enhancing adhesiveness to the coating film by subjecting the bumper surface to etching with a halogen-based organic solvent such as trichloroethane, or after subjecting the bumper to pretreatment such as corona discharge treatment, plasma treatment and ozone treatment.

However, coating or adhesion using such conventionally known general-purpose resin compositions requires not only high facility costs but also a long operation time. Also, the finishing cannot be done uniformly and consistently, thus it being liable to cause variations in the state of surface treatment.

Hence, in the past, for example, a composition comprising polyolefin incorporated with maleic acid (JP-B No. 62-21027, etc.), or a composition comprising polyolefin modified by chlorination as the main component (JP-B No. 50-10916, etc.) has been suggested as a coating composition having an improvement in the above-described problems.

However, although these compositions have excellent adhesiveness to the polyolefinic molded product, etc., since they have poor weather resistance, their use has been usually limited to the use as a primer or to the applications where weather resistance is not required. Therefore, in the case of performing coating with such compositions in applications where weather resistance is required, typically two-coat finish involving complicated operations is needed.

For this reason, development of a coating material which allows one-coat finish treatment, and which can exhibit excellent adhesiveness to materials even without any pretreatment and has excellent weather resistance, is in progress, and in this pertinent art, there have been suggested, for example, a resin which is obtained by copolymerization of an acrylic monomer and a chlorinated polyolefin (JP-A No. 58-71966, etc.); a coating composition comprising a copolymer of a hydroxyl-containing acrylic monomer and a chlorinated polyolefin, and an isocyanate compound (JP-A No. 59-27968); and the like. However, since these materials contain chlorine, their effect on the environment has become a matter of concern.

There have been also suggested a method of introducing unsaturated bonds to a polyolefin (JP-A No. 1-123812, JP-A No. 2-269109, etc.), a method of introducing organic peroxide (JP-A No. 1-131220, etc.), a method of using bifunctional organic peroxide (JP-A No. 64-36614, etc.) and the like, and these are the means to improve reactivity of polyolefin with radically polymerizable unsaturated monomers.

However, in many cases of the above-described resin compositions and methods for preparation thereof, drawbacks are found such that reaction should be carried out at dilute concentrations, particularly because of the viscosity problem; the efficiency of graft copolymerization to polyolefin is low; since there is a tendency that homopolymers of radically polymerizable unsaturated monomers are generated, the resulting resin solutions are highly liable to undergo separation and cannot be used directly as such, in general; and the coating obtained from these resin solutions has surface tackiness.

Moreover, with regard to adhesion between polyolefin and metal such as aluminum, resin dispersions of modified polypropylene (JP-A No. 63-12651, etc.) have been suggested. However, since these dispersions employ raw materials having high melting points in order to reduce tackiness of the coating film, they have a drawback that the heat-sealing temperature is high.

[Patent Document 1] JP-B No. 62-21027
[Patent Document 2] JP-B No. 50-10916
[Patent Document 3] JP-A No. 58-71966
[Patent Document 4] JP-A No. 59-27968
[Patent Document 5] JP-A No. 1-123812
[Patent Document 6] JP-A No. 2-269109
[Patent Document 7] JP-A No. 1-131220
[Patent Document 8] JP-A No. 64-36614
[Patent Document 9] JP-A No. 63-12651

The present invention is to provide a solvent dispersion of a composite resin which solves the above-described problems of the prior arts.

That is, it is an object of the invention to provide a coating material, a primer, an adhesive, an additive, a binder, a film, and a primer for strippable paints and traffic paints, which can be applied by spray coating as the resin solution does not undergo separation; which show no film surface tackiness when applied to form a coating film; which result in a coating film obtained by using a curing agent having an isocyanate group in the molecule, which exhibits superior weather resistance as compared with coating films of polyolefins modified by chlorination; which result in coating films that exhibit excellent adhesiveness to untreated polyolefinic resin films, sheets or molded products; and which have excellent heat-sealability at low temperatures.

SUMMARY OF THE INVENTION

The present inventors have devotedly conducted researches and investigations in order to achieve the above-described object, and as a result, they found that a resin solution obtained from raw materials comprising a specific thermoplastic elastomer (A) and copolymerizable monomers (B) consisting of a monomer having an α,β-monoethylenically unsaturated group and other copolymerizable monomer(s), and a resin which is obtained from the resulting resin solution incorporated with a curing agent having an isocyanate group in the molecule, would be very useful in achieving the above-described object, thus completing the invention.

Therefore, the present invention comprises the inventions as described in the following [1] to [28]:

[1] A solvent dispersion of a composite resin, which comprises a solvent and a composite resin comprising a thermoplastic elastomer (A) and a polymer of copolymerizable monomers (B) consisting of a monomer having an α,β-monoethylenically unsaturated group and other copolymerizable monomer(s), wherein the thermoplastic elastomer (A) is a propylene-based elastomer having a molecular weight distribution (Mw/Mn) of not more than 3 as measured by gel permeation chromatography (GPC), and the copolymerizable monomers (B) include at least one monomer containing no functional groups;

[2] The solvent dispersion of a composite resin according to [1], wherein the solvent is an organic solvent and/or water;

[3] The solvent dispersion of a composite resin according to [1], wherein the solvent is water and contains basic substance(s);

[4] The solvent dispersion of a composite resin according to [1], wherein the solvent is water and contains surfactant(s);

[5] The solvent dispersion of a composite resin according to [1], which is obtained by removing an organic solvent from a solvent dispersion of a composite resin comprising the organic solvent and water as the solvent, and which contains basic substance(s) or surfactant(s);

[6] The solvent dispersion of a composite resin according to any one of [3] to [5], which comprises water as the solvent, wherein the thermoplastic elastomer (A) and the copolymerizable monomers (B) are present in the same particle;

[7] The solvent dispersion of a composite resin according to [1], wherein the thermoplastic elastomer (A) has an intrinsic viscosity [η] of 0.1 to 12 dl/g as measured at 135° C. in decalin, and is a propylene-based elastomer (I) which contains (a) 50 to 93 mol % of a unit derived from propylene, (b) 5 to 50 mol % of a unit derived from α-olefin, and (c) 2 to 40 mol % of a unit derived from ethylene, or a propylene-based elastomer (II) which contains (a) 50 to 95 mol % of a unit derived from propylene and (b) 5 to 50 mol % of a unit derived from α-olefin;

[8] The solvent dispersion of a composite resin according to [1], wherein the thermoplastic elastomer is obtained by copolymerizing propylene and α-olefin, or by copolymerizing propylene, α-olefin and ethylene, in the presence of a catalyst for olefin polymerization which contains:

[i] a transition metal compound represented by the following formula (1):

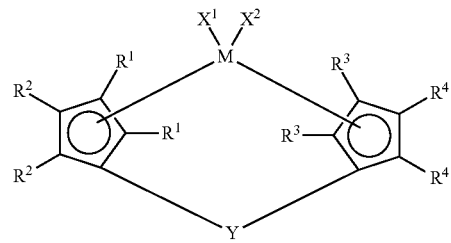

[Formula (1)]

wherein M is a transition metal atom from Groups IVb, Vb and VIb of the Periodic Table of Elements; $R^1$, $R^2$, $R^3$ and $R^4$ are each a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group, and some of the adjacent groups may be bonded to each other and form a ring together with the carbon atom to which these groups are attached; $X^1$ and $X^2$ may be identical with or different from each other, and are each a hydrogen atom, a halogen atom, a hydrocarbon group having 1 to 20 carbon atoms, a halogenated hydrocarbon group having 1 to 20 carbon atoms, a silicon-containing group, an oxygen-containing group or a sulfur-containing group; and Y is a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$—, wherein $R^5$ is a hydrogen atom, a halogen atom, a hydrocarbon group having 1 to 20 carbon atoms or a halogenated hydrocarbon group having 1 to 20 carbon atoms, and

[ii] at least one compound selected from the group consisting of:
[ii-1] an organoaluminum compound,
[ii-2] an organoaluminum-oxy compound, and
[ii-3] a compound forming ion pairs by reacting with the transition metal compound (1);

[9] The solvent dispersion of a composite resin according to [1], wherein the thermoplastic elastomer is obtained by copolymerizing propylene and α-olefin, or by copolymerizing propylene, α-olefin and ethylene, in the presence of a catalyst for olefin polymerization which contains:

[i] a transition metal compound represented by the following formula (2):

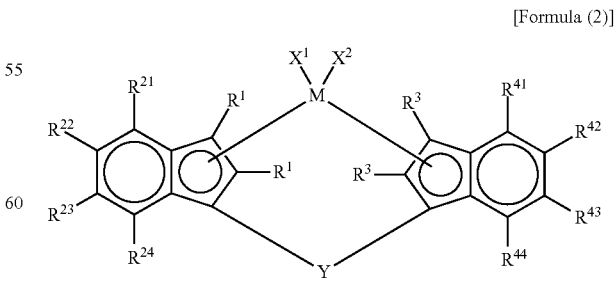

[Formula (2)]

wherein M, $R^1$, $R^3$, $X^1$, $X^2$ and Y have the same meanings as defined in the formula (1); and $R^{21}$ to $R^{24}$ and $R^{41}$ to $R^{44}$ are each a hydrogen atom, a halogen atom, an alkyl group having 2 to 6 carbon atoms or an aryl group having 6 to 16 carbon atoms, while this alkyl group or aryl group may be substituted with halogen atom(s) or organic silyl group(s), and adjacent substituents may form a ring, and

[ii] at least one compound selected from the group consisting of:
[ii-1] an organoaluminum compound,
[ii-2] an organoaluminum-oxy compound, and
[ii-3] a compound forming ion pairs by reacting with the transition metal compound (2);

[10] The solvent dispersion of a composite resin according to [1], wherein the thermoplastic elastomer is obtained by copolymerizing propylene and α-olefin, or by copolymerizing propylene, α-olefin and ethylene, in the presence of a catalyst for polymerization which contains:

[i] a transition metal compound represented by the following formula (3):

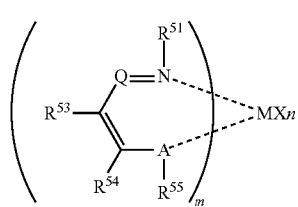

[Formula (3)]

wherein M is a transition metal atom from Groups Mb, IVb, Vb, VIb, VIIb and VIII of the Periodic Table of Elements;

m is an integer of 1 to 3;

Q is a nitrogen atom, or a carbon atom having a substituent $R^{52}$;

A is an oxygen atom, a sulfur atom, a selenium atom, or a nitrogen atom having a substituent $R^{56}$;

$R^{51}$ to $R^{56}$ may be identical with or different from each other, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group; and two or more of these may be joined together to form a ring; and when m is 2 or more, $R^{51}$ groups, $R^{52}$ groups, $R^{53}$ groups, $R^{54}$ groups, $R^{55}$ groups, and $R^{56}$ groups may be identical with or different from each other and one of the $R^{51}$ to $R^{56}$ groups in one ligand and one of the $R^{51}$ to $R^{56}$ groups in another ligand may be joined together;

n is a number satisfying the valence of M; and

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; and when n is 2 or more, X groups may be identical with or different from each other and may be bonded to each other to form a ring;

[11] The solvent dispersion of a composite resin according to [10], which is obtained by copolymerizing propylene and α-olefin, or by copolymerizing propylene, α-olefin and ethylene, in the presence of a catalyst for olefin polymerization which further contains:

[iii] at least one compound selected from the group consisting of:

[iii-1] an organometallic compound,
[iii-2] an organoaluminum-oxy compound, and
[iii-3] a compound forming ion pairs by reacting with the transition metal compound (3);

[12] The solvent dispersion of a composite resin according to any one of [8] to [11], wherein the α-olefin is 1-butene;

[13] The solvent dispersion of a composite resin according to [1], which is formed by (1) polymerizing the thermoplastic elastomer (A) and the copolymerizable monomers (B) in an organic solvent, (2) polymerizing the thermoplastic elastomer (A) and the copolymerizable monomers (B) and then reacting the resulting polymer under radical generation in an organic solvent, or (3) reacting the thermoplastic elastomer (A) and a polymer (C) composed of the copolymerizable monomers (B) under radical generation in an organic solvent;

[14] The solvent dispersion of a composite resin according to [1], wherein the weight ratio of the thermoplastic elastomer (A) and the copolymerizable monomers (B) is such that (A)/(B)=10/90 to 90/10;

[15] The solvent dispersion of a composite resin according to [1], wherein the thermoplastic elastomer (A) used is at least partly modified with a functional group;

[16] A coating material containing the solvent dispersion of a composite resin according to [1];

[17] A primer containing the solvent dispersion of a composite resin according to [1];

[18] An adhesive containing the solvent dispersion of a composite resin according to [1];

[19] An additive containing the solvent dispersion of a composite resin according to [1];

[20] A binder containing the solvent dispersion of a composite resin according to [1];

[21] A film which is obtained from the solvent dispersion of a composite resin according to [1];

[22] A coating material which contains a main agent comprising the solvent dispersion of a composite resin according to [1] having active hydrogen and/or a hydroxyl group, and a curing agent capable of reacting with the active hydrogen and/or the hydroxyl group;

[23] A primer which contains a main agent comprising the solvent dispersion of a composite resin according to [1] having active hydrogen and/or a hydroxyl group, and a curing agent capable of reacting with the active hydrogen and/or the hydroxyl group;

[24] An adhesive which contains a main agent comprising the solvent dispersion of a composite resin according to [1] having active hydrogen and/or a hydroxyl group, and a curing agent capable of reacting with the active hydrogen and/or the hydroxyl group;

[25] An additive which contains a main agent comprising the solvent dispersion of a composite resin according to [1] having active hydrogen and/or a hydroxyl group, and a curing agent capable of reacting with the active hydrogen and/or the hydroxyl group;

[26] A binder which contains a main agent comprising the solvent dispersion of a composite resin according to [1] having active hydrogen and/or a hydroxyl group, and a curing agent capable of reacting with the active hydrogen and/or the hydroxyl group;

[27] A film which is formed by reacting a main agent comprising the solvent dispersion of a composite resin according to [1] having active hydrogen and/or a hydroxyl group with a curing agent capable of reacting with the active hydrogen and/or the hydroxyl group; and

[28] A coating film which is formed by applying the coating material, primer, adhesive, additive or binder according to [16] to [20], or a coating film which is formed by curing the coating material, primer, adhesive, additive or binder according to [22] to [26].

DETAILED DESCRIPTION OF PREFERRED EMBODIMENTS

Hereinafter, the present invention will be explained in detail.

The solvent dispersion of a composite resin of the invention can be prepared by performing polymerization while feeding copolymerizable monomers (B) consisting of a monomer having an α,β-monoethylenically unsaturated group and other copolymerizable monomer(s), and a polymerization initiator to thermoplastic elastomer (A), or performing polymerization while feeding a polymerization initiator to thermoplastic elastomer (A) and copolymerizable monomers (B) consisting of a monomer having an α,β-monoethylenically unsaturated group and other copolymerizable monomer(s), and then reacting the product under radical generation. Further, the solvent dispersion of a composite resin can be also prepared by a method of reacting thermoplastic elastomer (A) and a polymer (C) which is composed of copolymerizable monomers (B) consisting of a monomer having an α,β-monoethylenically unsaturated group and other copolymerizable monomer(s) under radical generation. Furthermore, the solvent dispersion of a composite resin can be prepared by a method of performing polymerization while feeding copolymerizable monomers (B) consisting of a monomer having an α,β-monoethylenically unsaturated group and other copolymerizable monomer(s), and a polymerization initiator to a thermoplastic elastomer (A) which is partly modified with a functional group, or performing polymerization while feeding a polymerization initiator to a thermoplastic elastomer (A) which is partly modified with a functional group and copolymerizable monomers (B) consisting of a monomer having an α,β-monoethylenically unsaturated group and other copolymerizable monomer(s), and then reacting the product to react. The solvent dispersion of a composite resin can be also prepared by a method of reacting a thermoplastic elastomer (A) which is partly modified with a functional group, and a polymer (C) which is composed of copolymerizable monomers (B) consisting of a monomer having an α,β-monoethylenically unsaturated group and other copolymerizable monomer(s) under radical generation.

The thermoplastic elastomer (A) used in the invention may be exemplified by propylene-based elastomer (I) or (II).

<Propylene-Based Elastomers (I) and (II)>

The propylene-based elastomers (I) and (II) used in the invention are prepared by copolymerizing propylene, 1-butene and ethylene, or by copolymerizing propylene and 1-butene, in the presence of a catalyst for olefin polymerization which comprises [i] a specific transition metal compound, and [ii] at least one compound selected from the group consisting of [ii-1] organoaluminum compounds, [ii-2] organoaluminum oxy compounds, and [ii-3] compounds forming ion pairs by the reaction with the aforementioned transition metal compound (i). Transition metal compound [i] is represented by the formula (1):

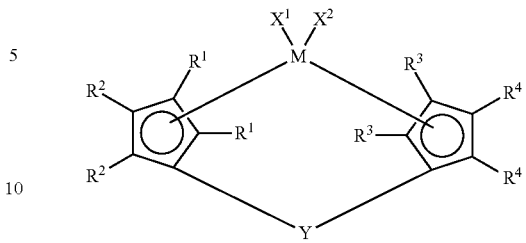

[Formula (1)]

In the formula, M is a transition metal atom from Groups IVb, Vb and VIb of the Periodic Table of Elements, and it is specifically titanium, zirconium, hafnium, vanadium, niobium, tantalum, chromium, molybdenum or tungsten, preferably titanium, zirconium or hafnium, and particularly preferably zirconium.

$R^1$, $R^2$, $R^3$ and $R^4$ may be identical with or different from each other and are each a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group. Further, some of the adjacent groups may be bonded to each other and form a ring together with the carbon atom to which the groups are bonded. Furthermore, $R^1$, $R^2$, $R^3$ and $R^4$, which are each present in two, are such that when they are bonded to each other to form a ring, preferably the groups under the same symbol are combined and bonded to each other. For example, it is preferable that $R^1$ and $R^1$ are bonded to form a ring.

The halogen atom may be exemplified by fluorine, chlorine, bromine and iodine.

The hydrocarbon group having 1 to 20 carbon atoms may be exemplified by an alkyl group such as methyl, ethyl, n-propyl, isopropyl, n-butyl, isobutyl, s-butyl, t-butyl, n-pentyl, 1,2-dimethylpropyl, 2,3-dimethylbutyl, isopentyl, t-pentyl, neopentyl, cyclopentyl, isohexyl, n-hexyl, cyclohexyl, 4-methylcyclohexyl, octyl, nonyl, dodecyl, eicosyl, norbornyl and adamantyl; an alkenyl group such as vinyl, propenyl and cyclohexenyl; an arylalkyl group such as benzyl, phenylethyl, phenylpropyl and tolylethyl; an aryl group such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl; and the like. The halogenated hydrocarbon group may be exemplified by the groups resulting from substitution of these hydrocarbon groups with halogen atoms.

Examples of the ring formed by bonding of these hydrocarbon groups include a fused ring such as a benzene ring, a naphthalene ring, an acenaphthene ring and an indene ring, and a fused ring in which a hydrogen atom is substituted by a methyl group, an ethyl group, a propyl group or a butyl group. The hydrocarbon groups may be substituted with halogen atoms.

The silicon-containing group may be exemplified by a silicon-containing substituent including monohydrocarbon-substituted silyl such as methylsilyl and phenylsilyl; dihydrocarbon-substituted silyl such as dimethylsilyl and diphenylsilyl; trihydrocarbon-substituted silyl such as trimethylsilyl, triethylsilyl, tripropylsilyl, tricyclohexylsilyl, triphenylsilyl, dimethylphenylsilyl, dimethyldiphenylsilyl, tritolylsilyl and trinaphthylsilyl; silyl ether of hydrocarbon-substituted silyl such as trimethylsilyl ether; silicon-substituted alkyl such as trimethylsilylmethyl; silicon-substituted aryl such as trimethylphenyl; and the like.

The oxygen-containing group may be exemplified by a hydroxyl group; an alkoxy group such as methoxy, ethoxy, propoxy and butoxy; an aryloxy group such as phenoxy, methylphenoxy, dimethylphenoxy and naphthoxy; an arylalkoxy group such as phenylmethoxy and phenylethoxy; and the like.

The sulfur-containing group may be exemplified by sulfur-containing groups in which oxygen of the above-mentioned oxygen-containing compounds is substituted by sulfur; a sulfonate group such as methylsulfonate, trifluoromethanesulfonate, phenylsulfonate, benzylsulfonate, p-toluenesulfonate, trimethylbenzylsulfonate, triisobutylbenzenesulfonate, p-chlorobenzenesulfonate and pentafluorobenzenesulfonate; and a sulfinate group such as methylsulfinate, phenylsulfinate, benzenesulfinate, p-toluenesulfinate, trimethylbenzenesulfinate, pentafluorobenzenesulfinate and trifluoromethanesulfinate.

The nitrogen-containing group may be exemplified by an amino group; an alkylamino group such as methylamino, dimethylamino, diethylamino, dipropylamino, dibutylamino and dicyclohexylamino; an arylamino group or alkylaryl group such as phenylamino, diphenylamino, ditolylamino, dinaphthylamino and methylphenylamino; and the like.

The phosphorus-containing group may be exemplified by a phosphino group such as dimethylphosphino and diphenylphosphino, and the like.

$R^1$ is preferably a hydrogen atom, a methyl group, a hydrocarbon group having 2 to 6 carbon atoms, an aryl group or the like, and particularly preferably a methyl group or a hydrocarbon group having 2 to 6 carbon atoms. $R^2$ and $R^4$ are, among these, each preferably a hydrogen atom or a hydrocarbon group, and particularly preferably a hydrogen atom. $R^3$ is preferably a halogen atom or a hydrocarbon group which may be substituted with a silicon-containing group, and inter alia, preferably a secondary or tertiary alkyl group having 3 to 20 carbon atoms, or an aryl group.

$X^1$ and $X^2$ may be identical with or different from each other, and are each a hydrogen atom, a halogen atom, a hydrocarbon group having 1 to 20 carbon atoms, a halogenated hydrocarbon group having 1 to 20 carbon atoms, a silicon-containing group, an oxygen-containing group or a sulfur-containing group.

For the specific atom or group, mention may be made of those described for $R^1$ to $R^4$.

Y is a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$—, wherein $R^5$ is a hydrogen atom, a halogen atom, a hydrocarbon group having 1 to 20 carbon atoms, or a halogenated hydrocarbon group having 1 to 20 carbon atoms.

The divalent hydrocarbon group may be exemplified by an alkylene group such as methylene, dimethylmethylene, 1,2-ethylene, dimethyl-1,2-ethylene, 1,2-trimethylene, 1,4-tetramethylene, 1,2-cyclohexylene, or 1,4-cyclohexylene; an arylalkylene group such as diphenylmethylene or diphenyl-1,2-ethylene; or the like.

Also, the divalent halogenated hydrocarbon group having 1 to 20 carbon atoms may be exemplified by the halogenation products of the above-mentioned divalent hydrocarbon groups having 1 to 20 carbon atoms, such as chloromethylene, or the like.

The divalent silicon-containing group may be exemplified by an alkylsilylene, alkylarylsilylene or arylsilylene group such as methylsilylene, dimethylsilylene, diethylsilylene, di(n-propyl)silylene, di(isopropyl)silylene, di(cyclohexyl)silylene, methylphenylsilylene, diphenylsilylene, di(p-tolyl)silylene or di(p-chlorophenyl)silylene; an alkyldisilyl, alkylaryldisilyl or aryldisilyl group such as tetramethyl-1,2-disilyl or tetraphenyl-1,2-disilyl; or the like.

The substituent as the divalent germanium-containing group or divalent tin-containing group may be exemplified by the compounds in which silicon of the above-mentioned divalent silicon-containing groups is substituted by germanium or tin, respectively.

Among these, preferred are the divalent silicon-containing groups, and particularly preferred are alkylsilylene, alkylarylsilylene and arylsilylene.

In the followings, examples of the transition metal compound [i] represented by the formula (1) will be listed: bis(cyclopentadienyl)zirconium dichloride, bis(indenyl)zirconium dichloride, bis(fluorenyl)zirconium dichloride, bis(n-propylcyclopentadienyl)zirconium dichloride, bis(t-butylcyclopentadienyl)zirconium dichloride, bis(trimethylsilylcyclopentadienyl)zirconium dichloride, bis(neopentylcyclopentadienyl)zirconium dichloride, rac-dimethylsilylenebis(1-cyclopentadienyl)zirconium dichloride, rac-dimethylsilylenebis{1-(3-methylcyclopentadienyl)}zirconium dichloride, rac-dimethylsilylenebis{1-(2,4-dimethylcyclopentadienyl)}zirconium dichloride, rac-dimethylsilylenebis{1-(2,3,5-trimethylcyclopentadienyl)}zirconium dichloride and the like may be mentioned.

Among the transition metal compounds [i] represented by the formula (1), those represented by the formula (2) are preferred:

[Formula (2)]

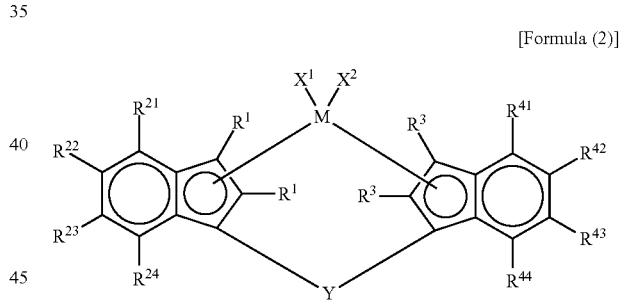

wherein M, $R^1$, $R^3$, $X^1$, $X^2$ and Y have the same meaning as defined for the formula (1); $R^{21}$ to $R^{24}$ and $R^{41}$ to $R^{44}$ are each a hydrogen atom, a halogen atom, an alkyl group having 2 to 6 carbon atoms or an aryl group having 6 to 16 carbon atoms; this alkyl group or aryl group may be substituted with halogen atom(s) or organic silyl group(s); and adjacent substituents may be bonded to each other to form a ring.

Specific examples thereof include rac-ethylenebis(1-indenyl)zirconium dichloride, rac-ethylenebis(1-indenyl)zirconium dibromide, rac-ethylenebis(1-indenyl)dimethylzirconium, rac-ethylenebis(1-indenyl)diphenylzirconium, rac-ethylenebis(1-indenyl)methylzirconium monochloride, rac-ethylenebis(1-indenyl)zirconium bis(methanesulfonate), rac-ethylenebis(1-indenyl)zirconium bis(p-toluenesulfonate), rac-ethylenebis(1-indenyl)zirconium bis(trifluoromethanesulfonate), rac-ethylenebis{1-(4,5,6,7-tetrahydroindenyl)}zirconium dichloride and the like; rac-dimethylsilylenebis(1-indenyl)zirconium dichloride, rac-dimethylsilylenebis{1-(2-methylindenyl)}zirconium dichloride, rac-dimethylsilylenebis{1-(2-methyl-4-isopropylindenyl)}zirconium dichloride, rac-dimethylsilylenebis{1-(2,7-dimethyl-4-ethylindenyl)}zirconium dichloride, rac-dimethylsilylenebis{1-(2,7-dimethyl-4-n-propylindenyl)}zirconium dichloride, rac-dimethylsilylenebis{1-(2,7-dimethyl-4-isopropylindenyl)}zirconium dichloride, rac-dimethylsilylenebis{1-(2,7-dimethyl-4-n-butylindenyl)}zirconium dichloride, rac-dimethylsilylenebis{1-(2,7-dimethyl-4-s-butylindenyl)}zirconium dichloride, rac-dimethylsilylenebis{1-(2,7-dimethyl-4-t-butylindenyl)}zirconium dichloride, rac-dimethylsilylenebis{1-(2,7-dimethyl-4-n-pentylindenyl)}zirconium dichloride, rac-dimethylsilylenebis{1-(2,7-dimethyl-4-n-hexylindenyl)}zirconium dichloride, rac-dimethylsilylenebis{1-(2,7-dimethyl-4-cyclohexylindenyl)}zirconium dichloride, rac-dimethylsilylenebis{1-(2,7-dimethyl-4-methylcyclohexylindenyl)}zirconium dichloride, rac-dimethylsilylenebis{1-(2,7-dimethyl-4-phenylethylindenyl)}zirconium dichloride, rac-dimethylsilylenebis{1-(2,7-dimethyl-4-phenyldichloromethylindenyl)}zirconium dichloride, rac-dimethylsilylenebis{1-(2,7-dimethyl-4-chloromethylindenyl)}zirconium dichloride, rac-dimethylsilylenebis{1-(2,7-dimethyl-4-trimethylsilylenemethylindenyl)}zirconium dichloride, rac-dimethylsilylenebis{1-(2,7-dimethyl-4-trimethylsiloxymethylindenyl)}zirconium dichloride and the like; rac-diethylsilylenebis{1-(2,7-dimethyl-4-isopropylindenyl)}zirconium dichloride, rac-di(isopropyl)silylenebis{dimethyl-4-isopropylindenyl)}zirconium dichloride, rac-di(n-butyl)silylenebis{1-(2,7-dimethyl-4-isopropylindenyl)}zirconium dichloride, rac-di(cyclohexyl)silylenebis{1-(2,7-dimethyl-4-isopropylindenyl)}zirconium dichloride, rac-methylphenylsilylenebis{1-(2,7-dimethyl-4-isopropylindenyl)}zirconium dichloride, rac-methylphenylsilylenebis{1-(2,7-dimethyl-4-t-butylindenyl)}zirconium dichloride, rac-diphenylsilylenebis{1-(2,7-dimethyl-4-t-butylindenyl)}zirconium dichloride, rac-diphenylsilylenebis{1-(2,7-dimethyl-4-isopropylindenyl)}zirconium dichloride, rac-diphenylsilylenebis{1-(2,7-dimethyl-4-ethylindenyl)}zirconium dichloride, rac-di(p-tolyl)silylenebis{1-(2,7-dimethyl-4-isopropylindenyl)}zirconium dichloride, rac-di(p-chlorophenyl)silylenebis{1-(2,7-dimethyl-4-isopropylindenyl)}zirconium dichloride and the like; rac-dimethylsilylenebis{1-(2-methyl-4-isopropyl-7-ethylindenyl)}zirconium dibromide, rac-dimethylsilylenebis{1-(2, 7-dimethyl-4-isopropylindenyl)}zirconium dimethyl, rac-dimethylsilylenebis{1-(2,7-dimethyl-4-isopropylindenyl)}zirconium methyl chloride, rac-dimethylsilylenebis{1-(2,7-dimethyl-4-isopropyl-1-indenyl)}zirconium (trifluoromethanesulfonate), rac-dimethylsilylenebis{1-(2,7-dimethyl-4-isopropyl-1-indenyl)}zirconium bis(p-phenylsulfinate) and the like; rac-dimethylsilylenebis{1-(2-phenyl-4-isopropyl-7-methyl-1-indenyl)}zirconium dichloride, rac-dimethylsilylenebis{1-(2-methyl-α-acenaphthoindenyl)}zirconium dichloride, rac-dimethylsilylenebis{1-(2-methyl-4,5-benzoindenyl)}zirconium dichloride, rac-dimethylsilylenebis{1-(2-methyl-4,6-diisopropylindenyl)}zirconium dichloride, rac-dimethylsilylenebis{1-(4-phenylindenyl)}zirconium dichloride, rac-dimethylsilylenebis{1-(2-methyl-4-phenylindenyl)}zirconium dichloride and the like; rac-dimethylsilylenebis{1-(2-methyl-4-(α-naphthyl)indenyl)}zirconium dichloride, rac-dimethylsilylenebis{1-(2-methyl-4-(β-naphthyl)indenyl)}zirconium dichloride, rac-dimethylsilylenebis{1-(2-methyl-4-(1-anthracenyl)indenyl)}zirconium dichloride, rac-dimethylsilylenebis{1-(2-methyl-4-(2-anthracenyl)indenyl)}zirconium dichloride, rac-dimethylsilylenebis{1-(2-methyl-4-(9-anthracenyl)indenyl)}zirconium dichloride, rac-dimethylsilylenebis{1-(2-methyl-4-(9-phenanthryl)indenyl)}zirconium dichloride and the like; rac-dimethylsilylenebis{1-(2-methyl-4-(p-fluorophenyl)indenyl)}zirconium dichloride, rac-dimethylsilylenebis{1-(2-methyl-4-(pentafluorophenyl)indenyl)}zirconium dichloride, rac-dimethylsilylenebis{1-(2-methyl-4-(p-chlorophenyl)indenyl)}zirconium dichloride, rac-dimethylsilylenebis{1-(2-methyl-4-(m-chlorophenyl)indenyl)}zirconium dichloride, rac-dimethylsilylenebis{1-(2-methyl-4-(o-chlorophenyl)indenyl)}zirconium dichloride, rac-dimethylsilylenebis{1-(2-methyl-4-(o,p-dichlorophenyl)phenylindenyl)}zirconium dichloride, rac-dimethylsilylenebis{1-(2-methyl-4-(p-bromophenyl)indenyl)}zirconium dichloride, rac-dimethylsilylenebis{1-(2-methyl-4-(p-tolyl)indenyl)}zirconium dichloride, rac-dimethylsilylenebis{1-(2-methyl-4-(m-tolyl)indenyl)}zirconium dichloride, rac-dimethylsilylenebis{1-(2-methyl-4-(o-tolyl)indenyl)}zirconium dichloride, rac-dimethylsilylenebis{1-(2-methyl-4-(o,o'-dimethylphenyl)-1-indenyl)}zirconium dichloride, rac-dimethylsilylenebis{1-(2-methyl-4-(p-ethylphenyl)indenyl)}zirconium dichloride, rac-dimethylsilylenebis{1-(2-methyl-4-(p-isopropylphenyl)indenyl)}zirconium dichloride, rac-dimethylsilylenebis{1-(2-methyl-4-(p-benzylphenyl)indenyl)}zirconium dichloride, rac-dimethylsilylenebis{1-(2-methyl-4-(p-biphenyl)indenyl)}zirconium dichloride, rac-dimethylsilylenebis{1-(2-methyl-4-(m-biphenyl)indenyl)}zirconium dichloride, rac-dimethylsilylenebis{1-(2-methyl-4-(p-trimethylsilylenephenyl)indenyl)}zirconium dichloride, rac-dimethylsilylenebis{1-(2-methyl-4-(m-trimethylsilylenephenyl)indenyl)}zirconium dichloride, rac-dimethylsilylenebis{2-phenyl-4-phenylindenyl)}zirconium dichloride and the like; rac-dimethylsilylenebis{1-(2-methyl-4-phenylindenyl)}zirconium dibromide, rac-dimethylsilylenebis{1-(2-methyl-4-phenylindenyl)}zirconium dimethyl, rac-dimethylsilylenebis{1-(2-methyl-4-phenylindenyl)}zirconium methyl chloride, rac-dimethylsilylenebis{1-(2-methyl-4-phenylindenyl)}zirconium chloride SO2Me, rac-dimethylsilylenebis{1-(2-methyl-4-phenylindenyl)}zirconium chloride OSO2Me, rac-dimethylsilylenebis{1-(2-methyl-4-phenylindenyl)}zirconium monochloride mono(trifluoromethanesulfonate), rac-dimethylsilylenebis{1-(2-methyl-4-phenylindenyl)}zirconium di(trifluoromethanesulfonate), rac-dimethylsilylenebis{1-(2-methyl-4-phenylindenyl)}zirconium di(p-toluenesulfonate), rac-dimethylsilylenebis{1-(2-methyl-4-phenylindenyl)}zirconium di(methylsulfonate), rac-dimethylsilylenebis{1-(2-methyl-4-phenylindenyl)}zirconium di(trifluoromethanesulfonate), rac-dimethylsilylenebis{1-(2-methyl-4-phenylindenyl)}zirconium di(trifluoroacetate), rac-dimethylsilylenebis{1-(2-methyl-4-phenylindenyl)}zirconium monochloride (n-butoxide), rac-dimethylsilylenebis{1-(2-methyl-4-phenylindenyl)} zirconium di(n-butoxide), rac-dimethylsilylenebis{1-(2-methyl-4-phenylindenyl)}zirconium monochloride (phenoxide) and the like; rac-methylenebis{1-(2-methyl-4-phenylindenyl)}zirconium dichloride, rac-ethylenebis{1-(2-methyl-4-phenylindenyl)}zirconium dichloride, rac-diisopropylsilylenebis{1-(2-methyl-4-phenylindenyl)}zirconium dichloride, rac-di(n-butyl)silylenebis{1-(2-methyl-4-phenylindenyl)}zirconium dichloride, rac-dicyclohexylsilylenebis{1-(2-methyl-4-phenylindenyl)}zirconium dichloride, rac-methylphenylsilylenebis{1-(2-methyl-4-phenylindenyl)}zirconium dichloride, rac-diphenylsilylenebis{1-(2-methyl-4-phenylindenyl)}zirconium dichloride, rac-di(p-tolyl)silylenebis{1-(2-methyl-4-phenylindenyl)}zirconium dichloride, rac-di(p-chlorophenyl)silylenebis{1-(2-methyl-4-phenylindenyl) }zirconium dichloride, rac-dimethylgermylenebis{1-(2-methyl-4-phenylindenyl)}zirconium dichloride, rac-dimethylstannylenebis{1-(2-methyl-4-phenylindenyl)}zirconium dichloride and the like; rac-dimethylsilylenebis{1-(2-ethyl-4-phenylindenyl)}zirconium dichloride, rac-dimethylsilylenebis{1-(2-ethyl-4-(α-naphthyl)indenyl)}zirconium dichloride, rac-dimethylsilylenebis{1-(2-ethyl-4-(β-naphthyl)indenyl)}zirconium dichloride, rac-dimethylsilylenebis{1-(2-ethyl-4-(2-methyl-1-naphthyl)indenyl)}zirconium dichloride, rac-dimethylsilylenebis{1-(2-ethyl-4-(5-acenaphthyl)indenyl)}zirconium dichloride, rac-dimethylsilylenebis{1-(2-ethyl-4-(9-anthracenyl)indenyl)}zirconium dichloride, rac-dimethylsilylenebis{1-(2-ethyl-4-(9-phenanthryl)indenyl)}zirconium dichloride, rac-dimethylsilylenebis{1-(2-ethyl-4-(o-methylphenyl)indenyl)}zirconium dichloride, rac-dimethylsilylenebis{1-(2-ethyl-4-(m-methylphenyl)indenyl)}zirconium dichloride, rac-dimethylsilylenebis{1-(2-ethyl-4-(p-methylphenyl)indenyl)}zirconium dichloride, rac-dimethylsilylenebis{1-(2-ethyl-4-(2,3-dimethylphenyl)indenyl)}zirconium dichloride, rac-dimethylsilylenebis{1-(2-ethyl-4-(2,4-dimethylphenyl)indenyl)}zirconium dichloride, rac-dimethylsilylenebis{1-(2-ethyl-4-(2,5-dimethylphenyl)indenyl)}zirconium dichloride, rac-dimethylsilylenebis{1-(2-ethyl-4-(2,4,6-trimethylphenyl)indenyl)}zirconium dichloride and the like; rac-dimethylsilylenebis{1-(2-ethyl-4-(o-chlorophenyl)indenyl)}zirconium dichloride, rac-dimethylsilylenebis{1-(2-ethyl-4-(m-chlorophenyl)indenyl)}zirconium dichloride, rac-dimethylsilylenebis{1-(2-ethyl-4-(p-chlorophenyl)indenyl)}zirconium dichloride, rac-dimethylsilylenebis{1-(2-ethyl-4-(2,3-dichlorophenyl)indenyl)}zirconium dichloride, rac-dimethylsilylenebis{1-(2-ethyl-4-(2,6-dichlorophenyl)indenyl)}zirconium dichloride, rac-dimethylsilylenebis{1-(2-ethyl-4-(3,5-dichlorophenyl)indenyl)}zirconium dichloride, rac-dimethylsilylenebis{1-(2-ethyl-4-(2-bromophenyl)indenyl)}zirconium dichloride, rac-dimethylsilylenebis{1-(2-ethyl-4-(3-bromophenyl)indenyl)}zirconium dichloride, rac-dimethylsilylenebis{1-(2-ethyl-4-(4-bromophenyl)indenyl)}zirconium dichloride and the like; rac-dimethylsilylenebis{1-(2-ethyl-4-(4-biphenyl)indenyl)}zirconium dichloride, rac-dimethylsilylenebis{1-(2-ethyl-4-(4-trimethylsilylenephenyl)indenyl)}zirconium dichloride, rac-dimethylsilylenebis{1-(2-n-propyl-4-phenylindenyl)}zirconium dichloride, rac-dimethylsilylenebis{1-(2-n-propyl-4-(α-naphthyl)indenyl)}zirconium dichloride, rac-dimethylsilylenebis{1-(2-n-propyl-4-(β-naphthyl)indenyl)}zirconium dichloride, rac-dimethylsilylenebis{1-(2-n-propyl-4-(2-methyl-1-naphthyl)indenyl)}zirconium dichloride, rac-dimethylsilylenebis{1-(2-n-propyl-4-(5-acenaphthyl)indenyl)}zirconium dichloride, rac-dimethylsilylenebis{1-(2-n-propyl-4-(9-anthracenyl)indenyl)}zirconium dichloride, rac-dimethylsilylenebis{1-(2-n-propyl-4-(9-phenanthryl)indenyl)}zirconium dichloride and the like; rac-dimethylsilylenebis{1-(2-isopropyl-4-phenylindenyl)}zirconium dichloride, rac-dimethylsilylenebis{1-(2-isopropyl-4-(α-naphthyl)indenyl)}zirconium dichloride, rac-dimethylsilylenebis{1-(2-isopropyl-4-(β-naphthyl)indenyl)}zirconium dichloride, rac-dimethylsilylenebis{1-(2-isopropyl-4-(2-methyl-1-naphthyl)indenyl)}zirconium dichloride, rac-dimethylsilylenebis{1-(2-isopropyl-4-(5-acenaphthyl)indenyl)}zirconium dichloride, rac-dimethylsilylenebis{1-(2-isopropyl-4-(9-anthracenyl)indenyl)}zirconium dichloride, rac-dimethylsilylenebis{1-(2-isopropyl-4-(9-phenanthryl)indenyl)}zirconium dichloride and the like; rac-dimethylsilylenebis{1-(2-s-butyl-4-phenylindenyl)}zirconium dichloride, rac-dimethylsilylenebis{1-(2-s-butyl-4-(α-naphthyl)indenyl)}zirconium dichloride, rac-dimethylsilylenebis{1-(2-s-butyl-4-(β-naphthyl)indenyl)}zirconium dichloride, rac-dimethylsilylenebis{1-(2-s-butyl-4-(8-methyl-9-naphthyl)indenyl)}zirconium dichloride, rac-dimethylsilylenebis{1-(2-s-butyl-4-(5-acenaphthyl)indenyl)}zirconium dichloride, rac-dimethylsilylenebis{1-(2-s-butyl-4-(9-anthracenyl)indenyl)}zirconium dichloride, rac-dimethylsilylenebis{1-(2-s-butyl-4-(9-phenanthryl)indenyl)}zirconium dichloride, rac-dimethylsilylenebis{1-(2-n-pentyl-4-phenylindenyl)}zirconium dichloride, rac-dimethylsilylenebis{1-(2-n-pentyl-4-(α-naphthyl)indenyl)}zirconium dichloride, rac-dimethylsilylenebis{1-(2-n-butyl-4-phenylindenyl)}zirconium dichloride, rac-dimethylsilylenebis{1-(2-n-butyl-4-(α-naphthyl)indenyl)}zirconium dichloride, rac-dimethylsilylenebis{1-(2-n-butyl-4-(β-naphthyl)indenyl)}zirconium dichloride, rac-dimethylsilylenebis{1-(2-n-butyl-4-(2-methyl-1-naphthyl)indenyl)}zirconium dichloride, rac-dimethylsilylenebis{1-(2-n-butyl-4-(5-acenaphthyl)indenyl)}zirconium dichloride, rac-dimethylsilylenebis{1-(2-n-butyl-4-(9-anthracenyl)indenyl)}zirconium dichloride, rac-dimethylsilylenebis{1-(2-n-butyl-4-(9-phenanthryl)indenyl)}zirconium dichloride, rac-dimethylsilylenebis{1-(2-isobutyl-4-phenylindenyl)}zirconium dichloride, rac-dimethylsilylenebis{1-(2-isobutyl-4-(α-naphthyl)indenyl)}zirconium dichloride, rac-dimethylsilylenebis{1-(2-isobutyl-4-(β-naphthyl)indenyl)}zirconium dichloride, rac-dimethylsilylenebis{1-(2-isobutyl-4-(2-methyl-1-naphthyl)indenyl)}zirconium dichloride, rac-dimethylsilylenebis{1-(2-isobutyl-4-(5-acenaphthyl)indenyl)}zirconium dichloride, rac-dimethylsilylenebis{1-(2-isobutyl-4-(9-anthracenyl)indenyl)}zirconium dichloride, rac-dimethylsilylenebis{1-(2-isobutyl-4-(9-phenanthryl)indenyl)}zirconium dichloride, rac-dimethylsilylenebis{1-(2-neopentyl-4-phenylindenyl)}zirconium dichloride, rac-dimethylsilylenebis{1-(2-neopentyl-4-(α-naphthyl)indenyl)}zirconium dichloride, rac-dimethylsilylenebis{1-(2-n-hexyl-4-phenylindenyl)}zirconium dichloride, rac-dimethylsilylenebis{1-(2-n-hexyl-4-(α-naphthyl)indenyl)}zirconium dichloride and the like; rac-methylphenylsilylenebis{1-(2-ethyl-4-phenylindenyl)}zirconium dichloride, rac-methylphenylsilylenebis{1-(2-ethyl-4-(α-naphthyl)indenyl)}zirconium dichloride, rac-methylphenylsilylenebis{1-(2-ethyl-4-(9-anthracenyl)indenyl)}zirconium dichloride, rac-methylphenylsilylenebis{1-(2-ethyl-4-(9-anthracenyl)indenyl)}zirconium dichloride, rac-diphenylsilylenebis{1-(2-ethyl-4-(α-naphthyl)indenyl)}zirconium dichloride, rac-diphenylsilylenebis{1-(2-ethyl-4-(9-anthracenyl)indenyl)}zirconium dichloride, rac-diphenylsilylenebis{1-(2-ethyl-4-(9-phenanthryl)indenyl)}zirconium dichloride, rac-diphenylsilylenebis{1-(2-ethyl-4-(4-biphenyl)-indenyl)}zirconium dichloride, rac-diphenylsilylenebis{1-(2-ethyl-4-(α-naphthyl)indenyl)} and the like; rac-methylenebis{1-(2-ethyl-4-phenylindenyl)}zirconium dichloride, rac-methylenebis{1-(2-ethyl-4-(α-naphthyl)indenyl)}zirconium dichloride, rac-ethylenebis{1-(2-ethyl-4-phenylindenyl)}zirconium dichloride, rac-ethylenebis{1-(2-n-propyl-4-(α-naphthyl)indenyl)}zirconium dichloride, rac-dimethylgermylenebis{1-(2-ethyl-4-phenylindenyl)}zirconium dichloride, rac-dimethylgermylenebis{1-(2-ethyl-4-(α-naphthyl)indenyl)}zirconium dichloride, rac-dimethylgermylenebis{1-(2-n-propyl-4-phenylindenyl)}zirconium dichloride, rac-dimethylstannylenebis{1-(2-ethyl-4-phenylindenyl)}zirconium dichloride, rac-dimethylstannylenebis{1-(2-ethyl-4-(α-naphthyl)indenyl)}zirconium dichloride, rac-dimethylstannylenebis{1-(2-ethyl-4-(9-phenanthryl)indenyl)}zirconium dichloride, rac-dimethylstannylenebis{1-(2-n-propyl-4-phenylindenyl)}zirconium dichloride and the like.

According to the invention, for the above-described compounds, a transition metal compound [i] in which zirconium is substituted by titanium, hafnium, vanadium, niobium, tantalum, chromium, molybdenum or tungsten can be also used. The transition metal compound [i] is usually used as a component of a catalyst for olefin polymerization in the form of a racemate, and either (R) configuration or (S) configuration can be also used. The transition metal compound [i] can be also used in combination.

According to the invention, for the compound [ii] which can activate the transition metal compound [i] (hereinafter, also referred to as a component [ii]), at least one compound selected from [ii-1] an organoaluminum compound, [ii-2] an organoaluminum oxy compound, and [ii-3] a compound forming ion pairs by the reaction with the above-mentioned transition metal compound [i], is used.

The organoaluminum compound [ii-1] used in the invention is, for example, represented by the following formula (4):

$R^1{}_n AlX_{3-n}$  [Formula (4)]

wherein $R^1$ is a hydrocarbon group having 1 to 12 carbon atoms; X is a halogen atom or a hydrogen atom; and n is from 1 to 3.

In the formula (4), $R^1$ is a hydrocarbon group having 1 to 12 carbon atoms, for example, an alkyl group, a cycloalkyl group or an aryl group, and specifically a methyl group, an ethyl group, an n-propyl group, an isopropyl group, an isobutyl group, a pentyl group, a hexyl group, an octyl group, a cyclopentyl group, a cyclohexyl group, a phenyl group, a tolyl group or the like.

Specific examples of the organoaluminum compound [ii-1] include the following compounds: trialkylaluminum such as trimethylaluminum, triethylaluminum, triisopropylaluminum, triisobutylaluminum, trioctylaluminum, tri(2-ethylhexyl)aluminum and tridecylaluminum; alkenylaluminum such as isoprenylaluminum; dialkylaluminum halide such as dimethylaluminum chloride, diethylaluminum chloride, diisopropylaluminum chloride, diisobutylaluminum chloride and dimethylaluminum bromide; alkylaluminum sesquihalide such as methylaluminum sesquichloride, ethylaluminum sesquichloride, isopropylaluminum sesquichloride, butylaluminum sesquichloride and ethylaluminum sesquibromide; alkylaluminum dihalide such as methylaluminum dichloride, ethylaluminum dichloride, isopropylaluminum dichloride and ethylaluminum dibromide; alkylaluminum hydride such as diethylaluminum hydride and diisobutylaluminum hydride; and the like.

Further, for the organoaluminum compound [ii-1], a compound represented by the following formula (5) can be also used:

$R^1{}_n AlY_{3-n}$  [Formula (5)]

wherein $R^1$ is the same as described above; Y is an $-OR^2$ group, an $-OSiR^3{}_3$ group, an $-OAlR^4{}_2$ group, an $-NR^5{}_2$ group, an $-SiR^6{}_3$ group or an $-N(R^7)AlR^8{}_2$ group; n is 1 or 2; $R^2$, $R^3$, $R^4$ and $R^8$ are each a methyl group, an ethyl group, an isopropyl group, an isobutyl group, a cyclohexyl group, a phenyl group or the like; $R^5$ is a hydrogen atom, a methyl group, an ethyl group, an isopropyl group, a phenyl group, a trimethylsilyl group or the like; and $R^6$ and $R^7$ are each a methyl group, an ethyl group or the like.

Specifically, the following compounds are listed.

(1) A compound represented by $R^1{}_n Al(OR^2)_{3-n}$, for example, dimethylaluminum methoxide, diethylaluminum ethoxide, diisobutylaluminum methoxide or the like;

(2) a compound represented by $R^1{}_n Al(OSiR^2)_{3-n}$, for example, $Et_2Al(OSiMe_3)$, $(iso-Bu)_2Al(OSiMe_3)$, $(iso-Bu)_2Al(OSiEt_3)$ or the like;

(3) a compound represented by $R^1{}_n Al(OAlR^4{}_2)_{3-n}$, for example, $Et_2AlOAlEt_2$, $(iso-Bu)_2AlOAl(iso-Bu)_2$ or the like;

(4) a compound represented by $R^1{}_n Al(NR^5{}_2)_{3-n}$, for example, $Me_2AlNEt_2$, $Et_2AlNHMe$, $Me_2AlNHEt$, $Et_2AlN(SiMe_3)_2$, $(iso-Bu)_2AlN(SiMe_3)_2$ or the like;

(5) a compound represented by $R^1{}_n Al(SiR^6{}_3)_{3-n}$, for example, $(iso-Bu)_2AlSiMe_3$ or the like; and (6) a compound represented by $R^1{}_n Al(N(R^7)AlR^8{}_2)_{3-n}$, for example, $Et_2AlN(Me)AlEt_2$, $(iso-Bu)_2AlN(Et)Al(iso-Bu)_2$ or the like. These may be used individually or in combination.

Among these, the compounds represented by the formulas $R^1{}_3Al$, $R^1{}_n Al(OR_2)_3$, or $R^1{}_n Al(OAlR^4{}_2)_{3-n}$ are preferred, and the compounds wherein $R^1$ is an iso-alkyl group in the formulas are preferred.

The organoaluminum compound [ii-2] used in the invention may be conventionally known, benzene-soluble aluminoxane, or the benzene-insoluble organoaluminum oxy compounds as disclosed in JP-A No. 2-78687.

Aluminoxane can be prepared by, for example, the following methods.

(1) A method of adding an organoaluminum compound such as trialkylaluminum, to a suspension of a compound containing adsorption water or of salts containing crystal water, for example, magnesium chloride hydrate, copper sulfate hydrate, aluminum sulfate hydrate, nickel sulfate hydrate, cerium(I) chloride hydrate or the like, in a hydrocarbon medium, and allowing to react;

(2) a method of subjecting an organoaluminum compound such as trialkylaluminum directly to the action of water, ice or steam, in a medium such as benzene, toluene, ethyl ether or tetrahydrofuran; and (3) a method of reacting an organoaluminum compound such as trialkylaluminum with an organotin oxide such as dimethyltin oxide or dibutyltin oxide, in a medium such as decane, benzene or toluene.

Aluminoxane may also contain a small amount of organometallic components. Further, from the above-described aluminoxane solutions that have been recovered, the solvent or unreacted organoaluminum compounds may be removed by distillation and then redissolved in a solvent.

The organoaluminum compound used in preparation of aluminoxane may be exemplified by those listed as the organoaluminum compounds [ii-1]. Specifically, trialkylaluminum and tricyclohexylaluminum are particularly preferred. The organoaluminum compounds [ii-1] may be used in combination of two or more species.

Examples of the solvent used in preparation of aluminoxanes include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and diesel oil; or halides, especially chloride, bromide and the like of the above-mentioned aromatic hydrocarbons, aliphatic hydrocarbons and alicyclic hydrocarbons. In addition to these, ethers such as ethyl ether and tetrahydrofuran can be also used. Among these solvents, particularly aromatic hydrocarbons are preferred.

Furthermore, the benzene-insoluble organoaluminum oxy compounds used in the invention are such that the content of the Al component which is soluble in benzene at 60° C. is 10% or less, preferably 5% or less, and particularly 2% or less, in terms of Al atoms, and the compounds are insoluble or sparingly soluble in benzene.

The solubility of such an organoaluminum oxy compound in benzene (x%) is determined by measuring the amount of Al

atoms (× millimoles) that are present in the entire filtrate obtained after the processes of suspending an amount of the organoaluminum oxy compound which corresponds to 100 milligram atoms of Al, in 100 ml of benzene, mixing the suspension at 60° C. for 6 hours under stirring, subsequently performing thermal time filtration the mixture at 60° C. using a jacketed G-5 glass filter, and washing the solid portion separated on the filter with 50 cm$^3$ of benzene for four times.

According to the invention, examples of the compound forming an ion pair [ii-3] by the reaction with the transition metal compound [i], which is used in formation of a catalyst for olefin polymerization, include the Lewis acids, ionic compounds and carborane compounds described in JP-A No. 1-501950, JP-A No. 1-502036, JP-A 3-179005, JP-A No. 3-179006, JP-A No. 3-207703, JP-A No. 3-207704, U.S. Pat. No. 547,718 and the like.

Specifically, examples of the Lewis acid include triphenylboron, tris(4-fluorophenyl)boron, tris(p-tolyl)boron, tris(o-tolyl)boron, tris(3,5-dimethylphenyl)boron, tris(pentafluorophenyl)boron, $MgCl_2$, $Al_2O_3$, $SiO_2$—$Al_2O_3$ and the like.

Examples of the ionic compound include triphenylcarbenium tetrakis(pentafluorophenyl)borate, tri-n-butylammonium tetrakis(pentafluorophenyl)borate, N,N-dimethylanilinum tetrakis(pentafluorophenyl)borate, ferrocenium tetra (pentafluorophenyl)borate and the like.

Examples of the carborane compound include dodecaborane, 1-carbaundecaborane, bis-n-butylammonium (1-carbadodeca)borate, tri-n-butylammonium (7,8-dicarbaundeca) borate, tri-n-butylammonium (tridecahydride-7-carbaundeca)borate and the like.

These may be used in combination of two or more species. According to the invention, as the compound [ii] which can activate the transition metal compound [i], components [ii-1], [ii-2] and [ii-3] as described above can be used in combination.

The catalyst for olefin polymerization can be prepared by mixing the above-described transition metal compounds [i] and component [ii] in an inert hydrocarbon solvent or an olefin solvent.

The inert hydrocarbon solvent used in preparation of the catalyst for olefin polymerization may be exemplified by aliphatic hydrocarbons such as propane, butane, pentane, hexane, heptane, octane, decane, dodecane and hexadecane; alicyclic hydrocarbons such as cyclopentane, cyclohexane, methylcyclopentane and cyclooctane; aromatic hydrocarbons such as benzene, toluene and xylene; halogenated hydrocarbons such as ethylene chloride, chlorobenzene and dichloromethane; petroleum fractions such as gasoline, kerosene and diesel oil; and mixtures thereof.

In preparation of a catalyst from each of these components, the transition metal compound [i] is preferably used in an amount of about $10^{-5}$ to $10^2$ mol/m$^3$ (polymerization volume), and more preferably in an amount of about $10^{-4}$ to $5 \times 10$ mol/m$^3$.

When the component [ii] that is to be used is the component [ii-1] and/or component [ii-2], the components are used in the amounts such that the atomic ratio of aluminum in component [ii] to the transition metal of the transition metal compound [i] (Al/transition metal) is from 10 to 10,000, and preferably from 20 to 5,000. When these component [ii-1] and component [ii-2] are used together, they are used in the amounts such that the atomic ratio between the atomic ratio of aluminum in component [ii-1], [Al-1], and the atomic ratio between the atomic ratio of aluminum in compound [ii-2], [Al-2], i.e., [Al-1]/[Al-2], is preferably from 0.02 to 3, and more preferably from 0.05 to 1.5.

Furthermore, when the component [ii] that is to be used is the component [ii-3], it is used in an amount such that the molar ratio of transition metal compound [i] to component [ii-3] ([i]/[ii-3]) is preferably from 0.01 to 10, and more preferably from 0.01 to 5.

The above-described components may be contacted in the polymerization vessel, or alternatively preliminarily contacted and mixed, and then added to the polymerization vessel. In the case of preliminarily contacting, the components can be contacted at a temperature of usually −50 to 150° C., and preferably −20 to 120° C., for 1 minute to 50 hours, and preferably 5 minutes to 25 hours. Also, upon contacting, the mixing temperature may be changed.

The catalyst for olefin polymerization used in the invention may be a solid catalyst for olefin polymerization in which at least one of the above-mentioned components [i] and [ii] is supported on a solid in the granular or microparticulate form (support).

The support may be an inorganic support or an organic support. As the inorganic support, porous oxide is preferably used, and for example, $SiO_2$, $Al_2O_3$ or the like may be used. As the organic support, a polymer or copolymer containing, for example, an α-olefin having 2 to 14 carbon atoms such as ethylene, propylene, 1-butene or 4-methyl-1-pentene, or styrene or vinyl cyclohexane as the main component, can be used.

The catalyst for olefin polymerization used in the invention can be also used in the form of prepolymerized catalyst that is prepared by prepolymerizing olefin with each of the above-described catalyst components. Examples of the olefin used in the prepolymerization include olefins such as propylene, ethylene or 1-butene, and these may be also used in combination with other olefins.

According to the invention, in the preparation of a catalyst for olefin polymerization, besides each of the components as described above, other components that are useful in olefin polymerization, for example, water as a catalyst component, can be also contained.

In addition, the propylene-based elastomers (I) and (II) that are used in the invention can be prepared by copolymerizing propylene, 1-butene and ethylene, or copolymerizing propylene and 1-butene, in the presence of a catalyst for olefin polymerization comprising the transition metal compound represented by the following formula (3):

[Formula (3)]

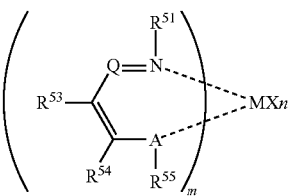

wherein M is a transition metal atom from Groups Mb, IVb, Vb, VIb, VIIb and VIII of the Periodic Table of Elements;

m is an integer of 1 to 3;

Q is a nitrogen atom or a carbon atom having a substituent $R^{52}$;

A is an oxygen atom, a sulfur atom, a selenium atom, or a nitrogen atom having a substituent $R^{56}$;

$R^{51}$ to $R^{56}$ may be identical with or different from each other, and are each a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group; two or more of these may be attached to each other to form a ring; when m is 2 or more, the $R^{51}$ groups, $R^{52}$ groups, $R^{53}$ groups, $R^{54}$ groups, $R^{55}$ groups and $R^{56}$ groups may be respectively identical with or different from each other; and one group among $R^{51}$ to $R^{56}$ contained in any one ligand may be attached to one group among $R^{51}$ to $R^{56}$ contained in another ligand;

n is a number balancing the valence of M;

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when n is 2 or more, X groups may be identical with or different from each other; or X groups may be bonded to each other to form a ring.

Further, the propylene-based elastomers (I) and (II) used in the invention can be also prepared by copolymerizing propylene, 1-butene and ethylene, or copolymerizing propylene and 1-butene, in the presence of a catalyst for olefin polymerization comprising:

[i] a transition metal compound represented by the above-described formula (3), and

[iii] at least one compound selected from the group consisting of

[iii-1] an organic metal compound,

[iii-2] an organoaluminum oxy compound, and

[iii-3] a compound forming ion pairs by the reaction with the transition metal compound (3).

The propylene-based elastomers (I) and (II) of the invention can be prepared by copolymerizing propylene, 1-butene and ethylene, or copolymerizing propylene and 1-butene, such that the consequently targeted composition ratio is achieved, in the presence of a catalyst for olefin polymerization as described above.

Polymerization can be carried out according to any of the liquid phase polymerization methods such as suspension polymerization, solution polymerization, or the gas phase polymerization method. In a liquid phase polymerization method, the inert hydrocarbon solvent as used in the preparation of the above-described catalyst can be used, or propylene can be used as the solvent.

When polymerization is carried out by suspension polymerization, it is carried out at a temperature of −50 to 100° C., and preferably 0 to 90° C. When polymerization is carried out by solution polymerization, it is carried out at a temperature of 0 to 250° C., and preferably 20 to 200° C. When polymerization is carried out by gas phase polymerization, it is carried out at a temperature of 0 to 120° C., and preferably 20 to 100° C., at a pressure of ambient pressure to 9.80 MPa, and preferably ambient pressure to 4.9 MPa.

Polymerization can be carried out in any of the batch mode, the semi-continuous mode and the continuous mode. Furthermore, it can be carried out in two or more stages under different polymerization conditions. The molecular weight of the resulting propylene-based elastomer can be adjusted by allowing the presence of hydrogen in the polymerization system, or by changing the polymerization temperature or polymerization pressure.

With respect to the propylene-based elastomers (I) and (II) obtained by the above-described methods, those having the following properties can be suitably used.

<Propylene-Based Elastomer (I)>

① Composition: The polymer contains (a) a unit derived from propylene at a proportion of 50 to 93 mol %, preferably 60 to 90 mol %, and more preferably 70 to 90 mol %; (b) a unit derived from 1-butene at a proportion of 5 to 50 mol %, preferably 7 to 40 mol %, and more preferably 10 to 35 mol %; and (c) a unit derived from ethylene at a proportion of 2 to 40 mol %, preferably 5 to 35 mol %, and more preferably 7 to 30 mol %, wherein the proportion of the unit derived from 1-butene is greater than the proportion of the unit derived from ethylene. The propylene-based elastomer (I) may further contain, in addition to the above-mentioned three components, a unit derived from different kinds of olefin at a proportion of 10 mol % or less, for example.

② Intrinsic viscosity [η]: The intrinsic viscosity [η] as measured at 135° C. in decalin is 0.1 to 12 dl/g, preferably 0.3 to 10 dl/g, and more preferably 0.5 to 8 dl/g.

③ Molecular weight distribution (Mw/Mn): The molecular weight distribution (Mw/Mn) determined by gel permeation chromatography (GPC) is 3 or less, preferably 1.5 to 3.0, and more preferably 1.5 to 2.5.

④ Melting point (Tm): The melting point (Tm) determined by differential scanning calorimetry is preferably 100° C. or lower, and more preferably 90° C. or lower. A polymer whose melting point is undetectable may be also used.

<Propylene-Based Elastomer (II)>

① Composition: The polymer contains (a) a unit derived from propylene at a proportion of 50 to 95 mol %, preferably 60 to 93 mol %, and more preferably 70 to 90 mol %; and (b) a unit derived from 1-butene at a proportion of 5 to 50 mol %, preferably 7 to 40 mol %, and more preferably 10 to 30 mol %. The propylene-based elastomer (II) may further contain, in addition to the above-mentioned two components, a unit derived from an olefin of different species at a proportion of 10 mol % or less, for example.

② Intrinsic viscosity [η]: The intrinsic viscosity [η] as measured at 135° C. in decalin is 0.1 to 12 dl/g, and preferably 0.3 to 10 dl/g.

③ Molecular weight distribution (Mw/Mn): The molecular weight distribution (Mw/Mn) determined by gel permeation chromatography (GPC) is 3 or less, preferably 1.5 to 3.0, and more preferably 1.5 to 2.5.

④ Melting point (Tm): The melting point (Tm) determined by differential scanning calorimetry is preferably 140° C. or lower, and more preferably 130° C. or lower. A polymer whose melting point is undetectable may be also used.

The thermoplastic elastomer (A) which is partly modified with functional groups, as described in the invention, can be obtained by reacting the above-described propylene-based elastomer (I), (II) or a mixture of these two, with copolymerizable monomers consisting of a monomer having an α,β-monoethylenically unsaturated group and other copolymerizable monomer(s), which contain a below-described functional group. However, it is also allowable to use unreactive monomers in some portion.

As the copolymerizable monomers consisting of a monomer having an α,β-monoethylenically unsaturated group and other copolymerizable monomer(s), which contain a functional group, as used herein, mention may be made of hydroxyl-containing vinyls such as hydroxyethyl acrylate, 2-hydroxyethyl (meth)acrylate, 2-hydroxypropyl (meth)acrylate, lactone-modified hydroxyethyl (meth)acrylate and 2-hydroxy-3-phenoxypropyl acrylate; carboxyl-containing vinyls such as acrylic acid, methacrylic acid, maleic acid, itaconic acid, ω-carboxy-polycaprolactone monoacrylate and phthalic acid monohydroxyethyl acrylate; nitrogen compounds such as acrylamide, methacrylamide, methylolacrylamide and methylolmethacrylamide; and anhydrous carboxylic acids such as anhydrous maleic acid and anhydrous citraconic acid. These may be used individually or in combination of two or more species. The amount of addition of the above-described copolymerizable monomers consisting of a monomer having an α,β-monoethylenically unsaturated group and other copolymerizable monomer(s), which contain a functional group, is in the range of 0.5 to 20% by weight, and preferably 1 to 15% by weight, relative to the weight of the thermoplastic elastomer.

Examples of the copolymerizable monomers (B) consisting of a monomer having an α,β-monoethylenically unsaturated group and other copolymerizable monomer(s), as used in the invention, include the following.

As the monomer having an α,β-monoethylenically unsaturated group, mention may be made of (meth)acrylic acid esters such as methyl (meth)acrylate, ethyl (meth)acrylate, propyl (meth)acrylate, n-butyl (meth)acrylate, i-butyl (meth) acrylate, tert-butyl (meth)acrylate, 2-ethylhexyl (meth)acrylate, stearyl (meth)acrylate, tridecyl (meth)acrylate, lauroyl (meth)acrylate, cyclohexyl (meth)acrylate, benzyl (meth) acrylate, phenyl (meth)acrylate, dimethylaminoethyl (meth) acrylate and diethylaminoethyl (meth)acrylate; hydroxyl-containing vinyls such as hydroxyethyl acrylate, 2-hydroxyethyl (meth)acrylate, 2-hydroxypropyl (meth) acrylate, lactone-modified hydroxyethyl (meth)acrylate and 2-hydroxy-3-phenoxypropyl acrylate; carboxyl-containing vinyls such as acrylic acid, methacrylic acid, maleic acid, itaconic acid, ω-carboxy-polycaprolactone monoacrylate and phthalic acid monohydroxyethyl acrylate, and monoesterification products thereof; epoxy-containing vinyls such as glycidyl (meth)acrylate and methylglycidyl (meth)acrylate; isocyanate-containing vinyls such as vinyl isocyanate and isopropenyl isocyanate; aromatic vinyls such as styrene, α-methylstyrene, vinyltoluene and t-butylstyrene; and in addition, acrylonitrile, methacrylonitrile, vinyl acetate, vinyl propionate, acrylamide, methacrylamide, methylolacrylamide and methylolmethacrylamide, ethylene, propylene, $C_{4-20}$ α-olefins, and the like. Macromonomers which have the above-mentioned monomers or copolymers thereof as segments and have vinyl groups at the terminals, can be also used.

As the copolymerizable monomers comprising other copolymerizable monomer(s) as used in the invention, mention may be made of anhydrous carboxylic acids such as anhydrous maleic acid and anhydrous citraconic acid, and the like.

As the monomers in which copolymerizable monomers (B) have no functional group, mention may be made of those obtained by excluding the above-described copolymerizable monomers (B) consisting of a monomer having an α,β-monoethylenically unsaturated group and other copolymerizable monomer(s), which contain a functional group, from the above-described copolymerizable monomers (B) consisting of a monomer having an α,β-monoethylenically unsaturated group and other copolymerizable monomer(s).

The expression "methyl (meth)acrylate" as described herein indicates methyl acrylate and methyl methacrylate.

These monomers preferably employ a monomer having an α,β-monoethylenically unsaturated group as the main component. Also, they may also employ a monomer having an α,β-monoethylenically unsaturated group as the main component, together with other copolymerizable monomer(s) in combination.

The polymer (C) as used in the invention is composed of the copolymerizable monomers (B) consisting of a monomer having an α,β-monoethylenically unsaturated group and other copolymerizable monomer(s).

The ratio by weight of the thermoplastic elastomer (A), and the copolymerizable monomers (B) consisting of a monomer having an α,β-monoethylenically unsaturated group and other copolymerizable monomer(s) or their polymer (C) of the invention is such that (A)/(B)=10/90 to 90/10, or (A)/(C) =10/90 to 90/10, and preferably (A)/(B)=10/90 to 80/20, or (A)/(C)=10/90 to 80/20.

According to the invention, organic solvents including aromatic hydrocarbons such as xylene, toluene and ethylbenzene; aliphatic hydrocarbons such as hexane, heptane, octane and decane; alicyclic hydrocarbons such as cyclohexane, cyclohexene and methylcyclohexane; ester solvents such as ethyl acetate, n-butyl acetate, cellosolve acetate, propylene glycol monomethyl ether acetate, propylene glycol monoethyl ether acetate and 3-methoxybutyl acetate; ketone solvents such as methyl ethyl ketone and methyl isobutyl ketone; and the like can be used, and mixtures of two or more of these can be also used. Among them, aromatic hydrocarbons, aliphatic hydrocarbons and alicyclic hydrocarbons are preferred, and aliphatic hydrocarbons and alicyclic hydrocarbons can be suitably used. The amount of the organic solvent that can be used is such that the proportion of non-volatile components of thermoplastic elastomer (A) when dissolved in the organic solvent is in the range of 5 to 60% by weight.

The polymerization initiator that is used in the invention may be exemplified by organic peroxide such as di-tert-butyl peroxide, tert-butylperoxy-2-ethylhexanoate, benzoyl peroxide, dicumyl peroxide, lauroyl peroxide, tert-butylperoxybenzoate and cumene hydroperoxide; and an azo compound such as azobis(isobutyronitrile), 4,4'-azobis(4-cyanopentanoic acid) and 2,2'-azobis(2-methyl-N-(2-hydroxyethyl) propionamide). These may be used individually or in combination of two or more species.

For the method of radical generation in the case where reaction is conducted by additionally generating radicals, conventionally known methods, for example, a method of irradiating light in the presence of a photopolymerization initiator, a method of adding organic peroxide, or the like, can be used.

Examples of the photopolymerization initiator include carbonyls such as benzophenone, diacetyl, benzyl, benzoin, 2-methylbenzoin, ω-bromoacetophenone, chloroacetone, acetophenone, 2,2-diethoxyacetophenone, 2,2-dimethoxy-2-phenylacetophenone, 2-hydroxy-2-methylpropiophenone, 2-chlorobenzophenone, p-dimethylaminopropiophenone, p-dimethylaminoacetophenone, p,p'-bisdiethylaminobenzophenone, 3,3',4,4'-tetrabenzophenone, Michler's ketone, benzoin methyl ether, benzoin isopropyl ether, benzoin isobutyl ether, benzoin n-butyl ether, 2,4,6-trimethylbenzoyldiphenylphosphine oxide, benzyldimethyl ketal and methylbenzoyl formate; sulfides such as diphenyl disulfide, dibenzyl disulfide and tetramethylthiuram monosulfide; quinones such as benzoquinone, anthraquinone, chloroanthraquinone, ethylanthraquinone and butylanthraquinone; thioxantones such as thioxantone, 2-methylthioxantone and 2-chlorothioxantone; and the like. These may be used individually or in combination of two or more species. Further, these photopolymerization initiators may be used together with amines such as triethylamine, trimethylamine, triethanolamine, dimethylaminoethanol, pyridine, quinoline and trimethylbenzylammonium chloride; arylphosphines such as triphenylphosphine; thiol ethers such as β-thiodiglycol; and the like.

The above-mentioned photopolymerization initiator exhibits a significant stabilizing effect when used in an amount in the range of preferably 0.01 to 10% by weight, and more preferably 0.1 to 5% by weight, relative to the total weight of the above-mentioned thermoplastic elastomer (A) and copolymerizable monomers (B) or polymer (C).

Examples of the organic peroxide include di-tert-butyl peroxide, tert-butylperoxy-2-ethyl hexanoate, benzoyl peroxide, dicumyl peroxide, tert-butylperoxybenzoate, lauroyl peroxide, cumene hydroperoxide and the like, each of which has a tert-butyl group and/or a benzyl group in the molecule. These may be used individually or in combination of two or more species.

According to the invention, among the above-described organic peroxides, di-tert-butyl peroxide or tert-butylperoxy-2-ethyl hexanoate is more preferably used. That is, organic peroxide having a tert-butyl group and/or a benzyl group in the molecule has a relatively high hydrogen-withdrawing ability and an effect of improving the rate of grafting to polyolefin.

The above-described organic peroxide has a significant stabilizing effect when used in an amount in the range of preferably 2 to 50% by weight, and more preferably 3 to 30% by weight, relative to the total weight of thermoplastic elastomer (A) and copolymerizable monomers (B) or polymer (C). Also, this organic peroxide is preferably added in small amounts, taking time as much as possible. That is, although it depends on the amount thereof to be used, the substance is preferably added in small amounts over a long time, or in small amounts in many times.

In preparation of the above-described resins, at least one selected from the group consisting of fats and oils, derivatives of fats and oils, epoxy resins and polyester resins, can be used as a third component.

Examples of the fats and oils that are used as the third component include linseed oil, soybean oil, castor oil, and purified products thereof.

Examples of the derivatives of fats and oils that are used as the third component include short oil alkyd resins, medium oil alkyd resins, long oil alkyd resins and the like, which have polybasic acid such as anhydrous phthalic acid and polyhydric alcohol such as pentaerythritol and ethylene glycol as the skeleton, and are modified with fats and oils (fatty acids); and further rosin-modified alkyd resins, phenol-modified alkyd resins, epoxy-modified alkyd resins, acrylated alkyd resins, urethane-modified alkyd resins and the like, which are modified with natural resins, synthetic resins and polymerizable monomers.

Examples of the epoxy resin used as the third component include epoxy resins resulting from glycidyl etherification of bisphenol A, bisphenol F, novolac and the like; epoxy resins resulting from glycidyl etherification of bisphenol A by adding propylene oxide or ethylene oxide thereto; and the like. Amine-modified epoxy resins resulting from addition of multifunctional amine to the epoxy group may be also used. Furthermore, aliphatic epoxy resins, alicyclic epoxy resins, polyether epoxy resins and the like may be mentioned.

The polyester resins that are used as the third component are the polycondensation products of carboxylic acid components and alcohol components. Examples of the carboxylic acid component include polybasic carboxylic acids such as terephthalic acid, isophthalic acid, anhydrous phthalic acid, naphthalene dicarboxylic acid, succinic acid, glutaric acid, adipic acid, azelaic acid, 1,10-decanedicarboxylic acid, cyclohexanedicarboxylic acid, trimellitic acid, maleic acid and fumaric acid, and their esters with lower alcohols; hydroxycarboxylic acids such as paraoxybenzoic acid; monobasic carboxylic acids such as benzoic acid; and the like. It is also possible to use them in combination of two or more species.

Examples of the alcohol component include ethylene glycol, diethylene glycol, 1,3-propanediol, 1,3-butanediol, 1,4-butanediol, 1,5-pentanediol, 1,6-hexanediol, 1,10-decanediol, 3-methylpentanediol, 2,2'-diethyl-1,3-propanediol, 2-ethyl-1,3-hexanediol, neopentyl glycol, trimethylolethane, trimethylolpropane, glycerin, pentaerythritol, ethylene oxide adduct of bisphenol A, a propylene oxide adduct of bisphenol A, an ethylene oxide adduct of hydrogenated bisphenol A, a propylene oxide adduct of hydrogenated bisphenol A and the like, and two or more species can be used in combination.

Also, it is possible to use a resin containing polymerizable unsaturated bonds in the molecule, which is obtained by addition of anhydrous carboxylic acid having polymerizable unsaturated bonds in the molecule to the aforementioned polyester resins having a hydroxyl group.

The above-mentioned third component may be used alone or in a combination of two or more species. The component can be added to the reactor by feeding, or introduced into the reactor at the beginning and used. The amount of the third component to be added is usually 0.5 to 60% by weight, and preferably 2 to 40% by weight, relative to the resin component.

In particular, the solvent dispersions of a composite resin prepared by using fats and oils as well as derivatives of fats and oils as the third component, have particularly good stability and good compatibility with other resins, as well as remarkably enhanced peel strength. Especially, a solvent dispersion containing castor oil has high effect.

According to the invention, mention may be made of a solvent dispersion of a composite resin containing water in the solvent, and its method for preparation can be exemplified by the below-described methods.

The solvent dispersion of a composite resin can be prepared from the resin or resin liquid obtained by the above-described methods, by means of a method of mixing the resin or resin liquid with ion-exchanged water and a surfactant all at once and emulsifying the mixture, or optionally removing all or part of the organic solvent thereafter; or a method of replacing all or part of the solvent used in dissolution, dilution or synthesis with a hydrophilic organic solvent, performing neutralization by adding a basic substance, and then adding ion-exchanged water, or optionally removing all or part of the organic solvent thereafter.

The surfactant used in the invention may be exemplified by a compound having both a hydrophobic group and a hydrophilic group in the same molecule, and examples thereof include an anionic surfactant, a nonionic surfactant, a cationic surfactant, other reactive surfactants and the like. These can be used individually or in combination of two or more species.

Examples of the nonionic surfactant include polyoxyethylene alkyl ether, polyoxyethylene alkylaryl ether, polyoxyethylene sorbitan ester, polyoxyethylene alkylamine ether and the like.

Examples of the anionic surfactant include fatty acid salts, higher alcohol sulfate esters, sodium alkylbenzenesulfonate, potassium oleate, a naphthalenesulfonic acid-formalin condensate, polyoxyethylene alkyl ether sulfate and the like. Particularly preferred are sodium alkylbenzenesulfonate and potassium oleate.

Examples of the cationic surfactant include lauryltrimethylammonium chloride, stearyltrimethylammonium chloride and the like.

The amount of the surfactant to be used is preferably about 0.05 to 40% by weight, more preferably about 0.1 to 20% by weight, and particularly preferably about 0.1 to 10% by weight, relative to the resin comprising a thermoplastic elastomer and copolymerizable monomers (B) consisting of a monomer having an α,β-monoethylenically unsaturated group and other copolymerizable monomer(s).

Further, examples of the hydrophilic organic solvent used in the invention include alcohols such as methyl alcohol, ethyl alcohol, isopropyl alcohol, butyl alcohol, isobutyl alcohol, 2-butyl alcohol, benzyl alcohol and cyclohexanol; ketones such as acetone, methyl ethyl ketone and methyl isobutyl ketone; ethers such as methyl cellosolve, ethyl cellosolve, butyl cellosolve, methyl carbitol, ethyl carbitol and butyl carbitol; and the like. These may be used individually or in combination of two or more species. The content of the hydrophilic organic solvent is preferably 50% or more, and more preferably 70% or more, relative to the total solvent amount of the resin solution.

Examples of the basic substance include amines such as ethylamine, propylamine, butylamine, benzylamine, triethylamine, monoethanolamine, diethylamine, diethanolamine, trimethylamine, triethylamine, triisopropylamine, dimethylethanolamine, triethanolamine, methyldiethanolamine, diethylenetriamine and ethylaminoethylamine; ammonia; and hydroxides of alkaline earth metals and of alkali metals such as sodium hydroxide and calcium hydroxide. The amount of addition thereof for neutralization is 50 to 100 mol % of the carboxyl group. Also, they may be used in combination of two or more species.

In addition to the above, it is also possible to prepare the solvent dispersion by polymerizing the copolymerizable monomers (B) consisting of a monomer having an α,β-monoethylenically unsaturated group and other copolymerizable monomer(s), in the presence of an emulsion in which the particles of the thermoplastic elastomer (A) are dispersed in water.

The emulsion having the thermoplastic elastomer (A) dispersed in water is an emulsion in which the thermoplastic elastomer (A) is dispersed in water by means of an emulsifier or a dispersant, and the methods for preparation thereof are disclosed in JP-B No. 7-008933, JP-B No. 5-039975 and the like.

For the initiator used in polymerization of the copolymerizable monomers (B) consisting of a monomer having an α,β-monoethylenically unsaturated group and other copolymerizable monomer(s), any of those generally used in emulsion polymerization can be used. Representative examples thereof include hydrogen peroxide; persulfates such as ammonium persulfate, potassium persulfate and sodium persulfate; organic peroxides such as cumene hydroperoxide, t-butyl hydroperoxide, benzoyl peroxide, t-butylperoxy-2-ethylhexanoate and t-butylperoxybenzoate; azo compounds such as azobisisobutyronitrile; and redox initiators formed by the above-mentioned ones combined with a reducing agent, including metal ions such as iron ions, sodium sulfoxylate, formaldehyde, sodium pyrosulfite, sodium hydrogen sulfite, L-ascorbic acid and Rongalite; and the like. These may be used individually or in combination of two or more species. Preferably used initiators are those having a solubility in water of 10% or less, more preferably 5% or less, and most preferably 1% or less.

Furthermore, it is also possible to use, if necessary, mercaptans such as t-dodecylmercaptan and n-dodecylmercaptan; allyl compounds such as allylsulfonic acid, methallylsulfonic acid, and sodium salts thereof; and the like, as a molecular weight adjusting agent.

In addition, upon polymerization of the copolymerizable monomers (B) consisting of a monomer having an α,β-monoethylenically unsaturated group and other copolymerizable monomer(s) in the presence of an emulsion of the thermoplastic elastomer (A), it is possible to use a surfactant that is generally used in emulsion polymerization, in order to improve the particle stability. The surfactant may be exemplified by the above-described anionic surfactants, nonionic surfactants, cationic surfactants, other reactive surfactants or the like, and these can be used individually or in combination of two or more species.

The amount of the surfactant to be used is not particularly limited. However, when the amount of use increases, the particles formed only from the copolymerizable monomers (B) consisting of a monomer having an α,β-monoethylenically unsaturated group and other copolymerizable monomer(s) may be generated, and thus the surfactant is used typically in an amount of 0.02 to 5% by weight based on the total weight of copolymerizable monomers (B).

Furthermore, in the case of incorporating a third component, it is preferable to use it as mixed with copolymerizable monomers (B).

The solvent dispersion of a composite resin of the invention may include those solvent dispersions having the resin dispersed in various solvents as well as those having the resin partly dissolved therein.

Also, the resin liquid of the invention can be used as a resin liquid in which after removing the dissolving agent, the resin is dissolved and dispersed in an arbitrary solvent. A resin liquid in which the resin is dissolved or dispersed, and a resin liquid in which the resin is dispersed in a resin liquid are all embodiments of the solvent dispersion of a composite resin of the invention and are included in the invention.

A resin liquid in which the resin obtained by carrying out a reaction in an organic solvent is dissolved or dispersed therein, and a resin liquid in which the resin is dispersed in a resin liquid are also embodiments of the resins of the invention and are included in the invention.

Among the solvent dispersions of a composite resin of the invention, those having active hydrogen and/or a hydroxyl group, which contain hydroxyethyl acrylate, 2-hydroxyethyl (meth)acrylate, acrylic acid, methacrylic acid and the like as the constituting unit, can be used with a curing agent which can react with the active hydrogen and/or hydroxyl group. For example, when such a solvent dispersion is mixed with a curing agent having an isocyanate group in the molecule, which is one of those curing agents which can react with active hydrogen and/or a hydroxyl group, the solvent dispersion can be used as a coating material, a primer or an adhesive, which has urethane bonds.

For the curing agent having an isocyanate group in the molecule, which can react with active hydrogen and/or a hydroxyl group, the following can be used: the adducts obtained from one or two or more species of aromatic diisocyanates such as phenylenediisocyanate, tolylenediisocyanate, xylylenediisocyanate and diphenylmethanediisocynate, aliphatic diisocyanates such as hexamethylenediisocyanate, trimethylhexamethylenediisocyanate and lysinediisocyanate, alicyclic diisocyanates such as isophorondiisocyanate and dicyclohexylmethanediisocyanate, and other isocyanate compounds, and from polyhydric alcohols, including dihydric alcohols such as ethylene glycol, propylene glycol, xylene glycol and butylene glycol, and trihydric alcohols such as glycerin, trimethylolpropane and trimethylolethane; the adducts of the above-mentioned isocyanate compounds and of low molecular weight polyester resins having a functional group which can react with an isocyanate group, or water; Biuret compounds; polymers of different diisocyantes; those having the isocyanate group blocked with a known blocking agent such as lower monohydric alcohols and methyl ethyl ketoxime; and the like. Also, in the case of using isocyanate prepolymers, it is possible to add an external catalyst such as, for example, dibutyltin dilaurate or triethylamine.

Furthermore, for a system containing water in the solvent, those systems in which the isocyanate group treated with a blocking agent such as oximes, lactams or phenols is present in water, for example, Takenate WB Series (manufactured by Mitsui Takeda Chemicals, Inc.), Elastron BN Series (Dai-ichi Kogyo Seiyaku Co., Ltd.) and the like, can be used.

Also it is possible to use as the curing agent, those amino resins which are resins synthesized from at least one of melamine, urea, benzoguanamine, glycoluryl and the like, and from formaldehyde, and the amino resins resulting from alkyl etherification of all or part of the methylol groups by means of lower alcohols such as methanol, ethanol, propanol, isopropanol, butanol and isobutanol.

In a system containing water in the solvent, oxazoline compounds can be used as the curing agent. For the aforementioned curing agent, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline or the like can be used as the curing agent.

The solvent dispersion of a composite resin of the invention and the curing agent which can react with active hydrogen and/or a hydroxyl group, can be used at any ratio.

When the curing agent which can react with active hydrogen and/or a hydroxyl group is a curing agent having an isocyanate group, the mixing ratio, as an equivalent ratio of active hydrogen and the isocyanate group, is preferably in the range of 0.5:1.0 to 1.0:0.5, and more preferably in the range of 0.8:1.0 to 1.0:0.8.

Also, when the curing agent which can react with active hydrogen and/or a hydroxyl group is an amino resin, the ratio of (solvent dispersion of a composite resin of the invention/amino resin), as a ratio by weight of the solid components, is preferably in the range of 95/5 to 20/80, and more preferably in the range of 90/10 to 60/40.

When the curing agent which can react with active hydrogen and/or a hydroxyl group is an oxazoline compound, the ratio of (composition of the invention/oxazoline compound), as a ratio by weight of the solid components, is preferably in the range of 95/5 to 20/80, and more preferably in the range of 90/10 to 60/40.

A solvent dispersion which is mixed with the above-described curing agents can be directly applied and cured, but it can be also combined with a reactive catalyst, if necessary.

The above-obtained solvent dispersion of a composite resin of the invention, or the solvent dispersion of a composite resin of the invention mixed with a curing agent which can react with active hydrogen and/or a hydroxyl group, can contain, if desired, ingredients including colorants, including organic pigments such as azo pigments and phthalocyanine blue, dyes such as azo dyes and anthraquinone dyes, and inorganic pigments such as titanium oxide, molybdenum and carbon black; various stabilizers such as an antioxidant, a weather resistant stabilizer and a heat resistant preventives; an antifoaming agent, a thickener, a dispersant, a surfactant, an antifungal agent, an antibacterial agent, an antiseptic, a catalyst, a filler, a wax, an antiblocking agent, a plasticizer, a leveling agent and the like.

The method of applying the solvent dispersion of a composite resin of the invention, or the solvent dispersion of a composite resin of the invention mixed with a curing agent which can react with active hydrogen and/or a hydroxyl group, is not particularly limited, but it is preferably carried out by spray coating. For example, the solvent dispersion can be applied by spraying strongly onto the surface to be coated with a spray gun. Usually, application can be easily carried out at room temperature. Further, the drying method after application is not particularly limited, and it is possible to carry out drying by any appropriate method such as natural drying and forced drying under heating.

Furthermore, the solvent dispersion of a composite resin of the invention, or the solvent dispersion of a composite resin of the invention mixed with a curing agent which can react with active hydrogen and/or a hydroxyl group, can be suitably used, due to its features, as an overcoat, a primer or an adhesive, for molded articles made of polyolefin such as polyethylene and polypropylene, an olefinic copolymer such as an ethylene-propylene copolymer, an ethylene-butene copolymer, a propylene-butene copolymer and an ethylene-propylene-butene copolymer; and molded articles made of polypropylene and a rubber component; polyamide resins, unsaturated polyesters, polycarbonate, epoxy resins, urethane resins, steel plates, electroplated steel plates and the like. Also, for overcoating, coating materials comprising urethane coating materials, polyester coating materials, melamine coating materials or epoxy coating materials as the main component can be used, in order to improve adherence to various surfaces to be coated and also to form a coating film having excellent distinctness of image.

In addition, the solvent dispersion of a composite resin of the invention, or the solvent dispersion of a composite resin of the invention mixed with a curing agent which can react with active hydrogen and/or a hydroxyl group, is used, due to its features, as an adhesive or a heat sealing agent between metals, between polyolefins, or between metal and polyolefin and exhibits excellent adhesive performance and cohesive performance, without having tackiness in the coating film. Also, upon heat sealing, the solvent dispersion of a composite resin of the invention exhibits its performance at low temperatures. The dispersion can be also used as an adhesive for PTP packaging and an adhesive for laminates.

In addition to the above-described applications, the solvent dispersion of a composite resin of the invention, or the solvent dispersion of a composite resin of the invention mixed with a curing agent which can react with active hydrogen and/or a hydroxyl group, can be used, due to its features, as a mixture with solvent-type thermoplastic acrylic resin coating materials, solvent-type thermosetting acrylic resin coating materials, acryl-modified alkyd resin coating materials, epoxy resin coating materials, polyurethane resin coating materials, and melamine resin coating materials.

The above-obtained solvent dispersion of a composite resin of the invention, or the solvent dispersion of a composite resin of the invention mixed with a curing agent which can react with active hydrogen and/or a hydroxyl group, can be used as a binder resin for colorants, including organic pigments such as an azo pigment and a phthalocyanine blue, dyes such as an azo dye and an anthraquinone dye, and inorganic pigments such as titanium oxide, molybdenum and carbon black; and inorganic chemicals such as aluminum oxide, calcium carbonate, calcium hydroxide, magnesium hydroxide, silica and barium titanate.

The film obtained by applying the above-obtained solvent dispersion of a composite resin of the invention, or the solvent dispersion of a composite resin of the invention mixed with a curing agent which can react with active hydrogen and/or a hydroxyl group, on a releasable film or the like and then peeling off therefrom, is excellent in flexibility, impact resistance, elasticity, transparency, gloss, blocking resistance and designability. Thus, the film can be used in applications such as clothing materials, various packaging materials, medical instruments, personal hygienic goods, various molded products, display layer materials for display panel and optical materials. Also, since it is possible to control light transmittance by elasticity and also to scatter transmitted light, the film can be used as an optical material such as a light-shielding film or a light-controlling film.

Furthermore, the above-obtained solvent dispersion of a composite resin of the invention, or the solvent dispersion of a composite resin of the invention mixed with a curing agent which can react with active hydrogen and/or a hydroxyl group, can be used as a primer for strippable paints and traffic paints.

EXAMPLES

Hereinafter, the invention is more specifically explained with reference to Examples, but is not limited to these Examples.

Example 1

Preparation of Propylene-Based Elastomer

To a 2-liter autoclave sufficiently purged with nitrogen, 950 $cm^3$ of hexane and 50 g of 1-butene were introduced, and 1 mmol of triisobutylaluminum was added. After elevating the temperature to 70° C., propylene and ethylene were supplied thereto to increase the total pressure to 0.69 MPaG. Then, 0.30 mmol of methylaluminoxane and 0.001 mmol (in terms of Zr atoms) of rac-dimethylsilylene-bis{1-(2-n-propyl-4-(9-phenanthryl)indenyl)}zirconium dichloride were added, and while maintaining the total pressure at 0.69 MPaG by continuously supplying propylene and ethylene at a molar ratio of 95:5, polymerization was carried out for 30 minutes. After polymerization, the autoclave was vented, and the polymer was recovered in a large amount of methanol and dried under reduced pressure at 110° C. for 12 hours to yield 28.0 g of a propylene-based elastomer (I-1). The polymerization activity was 56 kg·polymer/mmol of Zr·hr.

Preparation of Solvent Dispersion of a Composite Resin

A four-necked flask equipped with a stirrer, a thermometer, a reflux condenser and a nitrogen-inlet tube was charged with 100 parts by weight of the propylene-based elastomer (1-1) obtained by the method of Example 1 above and 250 parts by weight of Shellsol TG as an organic solvent. The mixture was heated to 130° C. under purging with nitrogen. Subsequently, a liquid mixture comprising 45 parts by weight of methyl methacrylate, 20 parts by weight of isobutyl methacrylate, 14 parts by weight of ethyl acrylate, 15 parts by weight of Placcel FM-3, 5 parts by weight of hydroxyethyl methacrylate, and 1 part by weight of methacrylic acid as a polymerizable monomer and 1 part by weight of di-tert-butyl peroxide (hereinafter, abbreviated to PBD) as a polymerization initiator, was fed to the flask over 4 hours. After 30 minutes from completion of feeding, the temperature was elevated to 135° C., and after further 30 minutes, 0.5 part by weight of PBD was added. After one more hour, 50 parts by weight of Shellsol TG was added, and simultaneously 0.5 part by weight of PBD was added. After 1 hour from this addition of PBD, the temperature was elevated to 160° C., and simultaneously 6 parts by weight of PBD was added. Further after one hour, 2 parts by weight of PBD was added, and after another hour, 2 parts by weight of PBD was added again to carry out the reaction. After addition of PBD, the reaction mixture was left to stand for 2 hours to undergo the reaction, and thus a solvent dispersion of a composite resin was obtained.

Shellsol TG used above is an isoparaffin-based organic solvent manufactured by Shell Chemicals Japan, Ltd., and Placcel FM-3 used as a polymerizable monomer is unsaturated fatty acid hydroxyalkyl ether-modified ε-caprolactone manufactured by Daicel Chemical Industries, Ltd.

Example 2

Preparation of Solvent Dispersion of a Composite Resin

The same method as in Example 1 was carried out, except that during the preparation of solvent dispersion of a composite resin, the solvent was all replaced with methylcyclohexane, the temperature in the system was maintained at 97° C. for all processes, and the polymerization initiator was changed to tert-butylperoxy-2-ethylhexanoate (hereinafter, abbreviated to PBO), to obtain a solvent dispersion of a composite resin.

Example 3

Preparation of Solvent Dispersion of a Composite Resin

A four-necked flask equipped with a stirrer, a thermometer, a reflux condenser and a nitrogen inlet tube was charged with 100 parts by weight of the propylene-based elastomer (I-1) obtained by the method of Example 1 above, and 200 parts by weight of Shellsol TG as an organic solvent. The mixture was heated to 130° C. under purging with nitrogen. Subsequently, a resin solution for dropwise addition obtained by the below-described method was added thereto dropwise over 1 hour, and after completion of the dropwise addition, the temperature inside the system was elevated to 140° C., and 6 parts by weight of PBD was added. After one hour, 2 parts by weight of PBD was added, and after another hour, 2 parts by weight of PBD was added again to carry out the reaction. After addition of PBD, the reaction mixture was left to stand for 2 hours to undergo the reaction, and thus a solvent dispersion of a composite resin was obtained.

Resin Solution for Dropwise Addition

A four-necked flask equipped with a stirrer, a thermometer, a reflux condenser and a nitrogen inlet tube was charged with 70 parts by weight of xylene and 30 parts by weight of Anone. The mixture was heated to 100° C. under purging with nitrogen. Subsequently, a liquid mixture comprising 45 parts by weight of methyl methacrylate, 14 parts by weight of ethyl acrylate, 20 parts by weight of isobutyl methacrylate, 5 parts by weight of hydroxyethyl acrylate, 15 parts by weight of Placcel FM-3, 1 part by weight of methacrylic acid and 1 part by weight of PBO, was fed thereto over 4 hours. After 30 minutes from completion of feeding, the temperature was elevated to 110° C., and after further 30 minutes, 0.5 part by weight of PBO was added. Further after 1 hour from this addition of PBO, 0.5 part by weight of PBO was added. After the addition of PBO, the reaction mixture was left to stand for 2 hours to undergo the reaction, and thus a resin solution was obtained.

Example 4

Preparation of Solvent Dispersion of a Composite Resin

The same method as in Example 3 was carried out, except that during the preparation of solvent dispersion of a composite resin, the solvent was all replaced with methylcyclohexane, the temperature in the system was maintained at 97° C. for all processes, and the polymerization initiator was changed to PBO, to obtain a solvent dispersion of a composite resin.

Example 5

Preparation of Solvent Dispersion of a Composite Resin

A four-necked flask equipped with a stirrer, a thermometer, a reflux condenser and a nitrogen inlet tube was charged with 100 parts by weight of the propylene-based elastomer (1-1) obtained by the method of Example 1 above and 150 parts by weight of Shellsol TG. The mixture was heated to 130° C. under purging with nitrogen. Subsequently, 3 parts by weight of Placcel FM-3 as a polymerizable monomer having a functional group was added and dispersed thereto, and then 3 parts by weight of PBD was added to carry out the reaction for 2 hours. Then, 115 parts by weight of Shellsol TG was added, and a resin in which the thermoplastic elastomer is partly modified with a functional group was obtained. Subsequently, while maintaining the temperature in the system at 130° C., a liquid mixture comprising 45 parts by weight of methyl methacrylate, 14 parts by weight of ethyl acrylate, 20 parts by weight of isobutyl methacrylate, 5 parts by weight of 2-hydroxyethyl methacrylate, 15 parts by weight of Placcel FM-3, 1 part by weight of methacrylic acid as the polymerizable monomer and 1 part by weight of PBD, was fed over 4 hours. After 30 minutes from completion of feeding, the temperature was elevated to 135° C., and after further 30 minutes, 50 parts by weight of Shellsol TG was added, and simultaneously 0.7 part by weight of PBD was added. Further after one hour, 0.7 part by weight of PBD was added. After 30 minutes from this addition of PBD, the temperature was elevated to 160° C., and the reaction mixture was left to stand for another one hour to undergo the reaction. Thus, a solvent dispersion of a composite resin was obtained.

Example 6

Preparation of Solvent Dispersion of a Composite Resin

The same method as in Example 5 was carried out, except that during the preparation of solvent dispersion of a composite resin, the solvent was all replaced with methylcyclohexane, the temperature in the system was maintained at 97° C. for all processes, and the polymerization initiator was changed to PBO, to obtain a solvent dispersion of a composite resin.

Example 7

Preparation of Propylene-Based Elastomer

In the preparation of propylene-based elastomer of Example 1, copolymerization of propylene, 1-butene and ethylene was carried out in the same manner as in Example 1, except that 60 g of 1-butene was introduced, and thus 24.1 g of propylene-based elastomer (1-2) was obtained. The polymerization activity was 48 kg·polymer/mmol of Zr·hr.

Preparation of Solvent Dispersion of a Composite Resin

The same method as in Example 1 was carried out, except that during the preparation of solvent dispersion of a composite resin, the propylene-based elastomer was changed to the propylene-based elastomer (I-2) obtained in Example 7 above, to obtain a solvent dispersion of a composite resin.

Example 8

Preparation of Solvent Dispersion of a Composite Resin

The same method as in Example 3 was carried out, except that during the preparation of solvent dispersion of a composite resin, the propylene-based elastomer was changed to the propylene-based elastomer (I-2) obtained in Example 7 above, to obtain a solvent dispersion of a composite resin.

Example 9

Preparation of Solvent Dispersion of a Composite Resin

The same method as in Example 5 was carried out, except that during the preparation of solvent dispersion of a composite resin, the propylene-based elastomer was changed to the propylene-based elastomer (I-2) obtained in Example 7 above, to obtain a solvent dispersion of a composite resin.

Example 10

Preparation of Propylene-Based Elastomer

To a 2-liter autoclave sufficiently purged with nitrogen, 900 $cm^3$ of hexane and 90 g of 1-butene were introduced, and 1 mmol of triisobutylaluminum was added. After elevating the temperature to 70° C., propylene and ethylene were supplied thereto to increase the total pressure to 0.69 MPaG. Then, 0.30 mmol of methylaluminoxane and 0.001 mmol (in terms of Zr atoms) of rac-dimethylsilylene-bis{1-(2-methyl-4-phenylindenyl)}zirconium dichloride were added, and while maintaining the total pressure at 0.69 MPaG by continuously supplying propylene, polymerization was carried out for 30 minutes. After polymerization, the autoclave was vented, and the polymer was recovered in a large amount of methanol and dried under reduced pressure at 110° C. for 12 hours to yield 39.7 g of a propylene-based elastomer (II). The polymerization activity was 79 kg·polymer/mmol of Zr·hr.

Preparation of Solvent Dispersion of a Composite Resin

The same method as in Example 1 was carried out, except that during the preparation of solvent dispersion of a composite resin, the propylene-based elastomer was changed to the propylene-based elastomer (II) obtained in Example 10 above, to obtain a solvent dispersion of a composite resin.

Example 11

Preparation of Solvent Dispersion of a Composite Resin

The same method as in Example 2 was carried out, except that during the preparation of solvent dispersion of a composite resin, the propylene-based elastomer was changed to the propylene-based elastomer (II) obtained in Example 10 above, to obtain a solvent dispersion of a composite resin.

Example 12

Preparation of Solvent Dispersion of a Composite Resin

The same method as in Example 3 was carried out, except that during the preparation of solvent dispersion of a composite resin, the propylene-based elastomer was changed to the propylene-based elastomer (II) obtained in Example 10 above, to obtain a solvent dispersion of a composite resin.

Example 13

Preparation of Solvent Dispersion of a Composite Resin

The same method as in Example 4 was carried out, except that during the preparation of solvent dispersion of a composite resin, the propylene-based elastomer was changed to the propylene-based elastomer (II) obtained in Example 10 above, to obtain a solvent dispersion of a composite resin.

Example 14

Preparation of Solvent Dispersion of a Composite Resin

The same method as in Example 5 was carried out, except that during the preparation of solvent dispersion of a composite resin, the propylene-based elastomer was changed to the propylene-based elastomer (II) obtained in Example 10 above, to obtain a solvent dispersion of a composite resin.

Example 15

Preparation of Solvent Dispersion of a Composite Resin

The same method as in Example 6 was carried out, except that during the preparation of solvent dispersion of a composite resin, the propylene-based elastomer was changed to the propylene-based elastomer (II) obtained in Example 10 above, to obtain a solvent dispersion of a composite resin.

Examples 16 to 24

To each of the solvent dispersions of a composite resin obtained in Examples 1, 3, 5, 7 to 10, 12 and 14, D-170HN (Mitsui Takeda Chemicals, Inc., product name) was incorporated as a curing agent to give a resin solution. The amount of mixing was 2.6 parts by weight of the curing agent relative to 100 parts by weight of the solvent dispersion of a composite resin for Examples 1, 3, 7, 8, 10 and 12, and 3.1 parts by weight of the curing agent relative to 100 parts by weight of the solvent dispersion of a composite resin for Examples 5, 9 and 14.

Examples 25 to 33

To each of the dispersions of a composite resin obtained in Examples 1, 3, 5, 7 to 10, 12 and 14, 30% by weight of titanium oxide pigment (Tipaque-CR93 (Ishihara Sangyo Co., Ltd., product name)) and 40 parts by weight of an organic solvent mixture at a ratio of xylene/toluene/methyl isobutyl ketone=1/1/1 relative to each resin content were added, to obtain a paint resin.

Example 34

Five hundred grams of the resin solution obtained in Example 6, 500 g of ion-exchanged water and 5 g of potassium oleate (Kanto Chemical Co., Inc.) were mixed for 30 minutes with stirring at a rotation speed of 10,000 rpm. Next, 1 g of polyacrylic acid was added and mixed with stirring to obtain an emulsion. Methylcyclohexane in the thus obtained emulsion was removed under reduced pressure in an evaporator to obtain a solvent dispersion of a composite resin.

Example 35

Synthesis was carried out by the same method as in Example 6, except that the polymerizable monomer was changed to 49 parts of methyl methacrylate, 21 parts of ethyl acrylate, 14 parts of isobutyl methacrylate, 14 parts of 2-hydroxyethyl methacrylate, 21 parts of Placcel FM-3 and 21 parts of methacrylic acid, to obtain a resin solution. To the resulting resin solution, 300 parts of butyl cellosolve was added and dissolved therein, and then neutralization with triethylamine was carried out to a theoretical extent of 100%. Then, the solvent was removed under heating at 100° C. and reduced pressure. This was adjusted with deionized water to contain 40% of non-volatile components, and thus a solvent dispersion of a composite resin was obtained.

Example 36

To a pressurized kneader, 100 parts of the propylene-based elastomer (1-1) described in Example 1, 10 parts of maleic anhydride grafted polyethylene (maleic acid content: 3.3 wt %, weight-average molecular weight: 2700, density: 0.94 $g/cm^3$), which acts as a dispersant under the action of basic substances, and 5 parts of oleic acid were introduced, and the mixture was melt-kneaded at 140° C. for 30 minutes. Next, 20 parts of alkaline water in which potassium hydroxide (basic substance) which is necessary in neutralizing all of the carboxylic acids of maleic anhydride grafted polyethylene and oleic acid was dissolved, was introduced under pressure for 5 minutes using a pump connected to the kneader. The pressure inside the kneader reached 3 $kg/cm^3G$. Mixing was continued for 30 minutes thereafter, then the kneader was cooled to 60° C., and the content was removed. The content was a white solid. Ten parts of the white solid was introduced in 10 parts of water, and the mixture was stirred with a turbine-blade stirrer and then filtered through a 100-mesh wire gauze. The residues were neglected.

A reactor was charged with 140 parts of the above-obtained emulsion and 152 parts of deionized water, and the temperature was elevated to 80° C. under a nitrogen atmosphere. Apart from this, an emulsified mixture was prepared by emulsifying 15 parts of styrene, 15 parts of 2-ethylhexyl acrylate, 3 parts of 2-hydroxyethyl methacrylate and 0.3 part of benzoyl peroxide in 12 parts of deionized water using 0.12 part of sodium dodecylbenzenesulfonate. This emulsified mixture was added dropwise to the reactor over 3 hours, and then the system was maintained at the same temperature for 4 hours to complete polymerization. Thus, a solvent dispersion of a composite resin was obtained.

Comparative Example 1

Preparation of Propylene-Based Elastomer

To a 500 $cm^3$-flask, 250 $cm^3$ of n-decane, 1.25 mmol of triisobutylaluminum, 0.15 mmol of diphenyldimethoxysilane, and 0.025 mmol (in terms of titanium atoms) of a titanium catalyst supported on magnesium chloride were added, the temperature was elevated to 70° C., 10 dm³/hr of ethylene, 120 dm³/hr of propylene, 80 dm³/hr of 1-butene and 10 dm³/hr of hydrogen were introduced continuously to the solvent under normal pressure, and polymerization was carried out at 70° C. for 30 minutes. Polymerization was carried out in the solution state. Polymerization was stopped by addition of isobutyl alcohol, and the entire amount of the polymer was precipitated in a large quantity of methanol and dried overnight under vacuum at 120° C. to yield 15 g of a propylene-based elastomer (III).

Preparation of Solvent Dispersion of a Composite Resin

The same method as in Example 1 was carried out, except that during the preparation of solvent dispersion of a composite resin, the propylene-based elastomer was changed to the propylene-based elastomer (III) obtained in the above Comparative Example 1, to obtain a solvent dispersion of a composite resin.

Comparative Example 2

Preparation of Solvent Dispersion of a Composite Resin

The same method as in Example 3 was carried out, except that during the preparation of solvent dispersion of a composite resin, the propylene-based elastomer was changed to the propylene-based elastomer (III) obtained in the above Comparative Example 1, to obtain a solvent dispersion of a composite resin.

Comparative Example 3

Preparation of Solvent Dispersion of a Composite Resin

The same method as in Example 5 was carried out, except that during the preparation of solvent dispersion of a composite resin, the propylene-based elastomer was changed to the propylene-based elastomer (III) obtained in the above Comparative Example 1, to obtain a solvent dispersion of a composite resin.

Comparative Example 4

Preparation of Propylene-Based Elastomer

To a 2-liter autoclave sufficiently purged with nitrogen, 830 ml of hexane and 100 g of 1-butene were introduced, and 1 mmol of triisobutylaluminum was added. After elevating the temperature to 70° C., propylene was supplied thereto to increase the total pressure to 0.69 MPaG. Then, 1 mmol of triethylaluminum and 0.005 mmol (in terms of titanium atoms) of a titanium catalyst supported on magnesium chloride were added, and while maintaining the total pressure at 0.69 MPaG by continuously supplying propylene, polymerization was carried out for 30 minutes. After polymerization, the autoclave was vented, and the polymer was recovered in a large amount of methanol and dried under reduced pressure at 110° C. for 12 hours to yield 33.7 g of a propylene-based elastomer (IV).

Preparation of Solvent Dispersion of a Composite Resin

The same method as in Example 10 was carried out, except that during the preparation of solvent dispersion of a composite resin, the propylene-based elastomer was changed to the propylene-based elastomer (IV) obtained in the above Comparative Example 4, to obtain a solvent dispersion of a composite resin.

Comparative Example 5

Preparation of Solvent Dispersion of a Composite Resin

The same method as in Example 12 was carried out, except that during the preparation of solvent dispersion of a composite resin, the propylene-based elastomer was changed to the propylene-based elastomer (IV) obtained in the above Comparative Example 4, to obtain a solvent dispersion of a composite resin.

Comparative Example 6

Preparation of Solvent Dispersion of a Composite Resin

The same method as in Example 14 was carried out, except that during the preparation of solvent dispersion of a composite resin, the propylene-based elastomer was changed to the propylene-based elastomer (IV) obtained in the above Comparative Example 4, to obtain a solvent dispersion of a composite resin.

<<Evaluation>>

Evaluation of propylene-based elastomers (I) and (II)

Each of the obtained propylene-based elastomers (I) and (II) was evaluated by the below-described methods. The results were shown in Table 1.

<Composition>

It was determined using $^{13}$C-NMR.

<Intrinsic Viscosity [η]>

It was measured in decalin at 135° C.

<Molecular Weight Distribution (Mw/Mn)>

It was measured as follows, using a GPC-150C manufactured by Millipore Corp. The separating column was TSK GNH HT, and the column size was 27 mm in diameter and 600 mm in length. The column temperature was set at 140° C., and the mobile phase used was o-dichlorobenzene (Wako Pure Chemical Industries, Ltd.) and 0.025% by weight of BHT (Takeda Pharmaceutical Co., Ltd.) as an antioxidant. The flow rate was 1.0 cm³/min. The sample concentration was 0.1% by mass, the amount of the sample injected was 0.5 cm³, and the detector used was a differential refractometer. For the standard polystyrene, products of Tosoh Corporation were used for the molecular weights of Mw<1000 and Mw>4×10⁶, and a product of Pressure Chemical Co. was used for the molecular weight of 1000<Mw<4×10⁶.

<Melting Point (Tm)>

About 5 mg of the sample was placed in an aluminum pan, and the temperature was elevated to 200° C. at a rate of 10° C./min, maintained at 200° C. for 5 minutes, lowered to room temperature at a rate of 20° C./min and subsequently elevated at a rate of 10° C./min, at which time an endothermic curve was determined. The measurement was made using a DSC-7 type apparatus manufactured by PerkinElmer, Inc.

TABLE 1

| | | Propylene-based Elastomer | | | | |
|---|---|---|---|---|---|---|
| | | I-1 | I-2 | II | III | IV |
| Composition | Propylene | 69.6 | 65.0 | 73.6 | 68.2 | 74.7 |
| (mol %) | 1-Butene | 15.3 | 20.0 | 26.4 | 21.5 | 25.3 |
| | Ethylene | 15.1 | 15.0 | | 10.3 | |
| Intrinsic Viscosity [η] (dl/g) | | 2.40 | 2.30 | 1.80 | 2.00 | 1.89 |
| Molecular Weight Distribution (Mw/Mn) | | 2.1 | 2.2 | 2.0 | 5.1 | 3.5 |
| Melting Point (Tm) (° C.) | | 72.2 | 64.5 | 88.4 | 78.3 | 110.0 |

Evaluation of the Resulting Solvent Dispersions of Composite Resin

Each of the resulting solvent dispersions of a composite resin was evaluated by the below-described method. The results were shown in Table 2 and Table 3.

<Stability of Resin Solution>

The resin composition solutions obtained in Examples 1 to 15, 34 to 36 and Comparative Examples 1 to 6 were allowed to stand at room temperature and at 40° C. for 1 month, respectively and the states of the solutions were evaluated. After elapse of 1 month, the resin composition solution, which was observed to be free from separation and precipitation was evaluated as ○, the resin composition solution, which was observed to have separation and/or precipitation but was easily dispersed by stirring, was evaluated as Δ and the resin composition, which was observed to have separation and/or precipitation and was not easily dispersed by stirring, was evaluated as x.

<Sprayability of Resin Solution>

The resin composition solution obtained in each of the Examples and Comparative Examples was sprayed using a coating gun (Wider Spray Gun manufactured by Iwata Tosoki Kogyo Co. (tradename; W-88-13H5G)) at an atomization pressure of 4 kg/cm$^2$, with a nozzle opening per rotation and the temperature in the coating booth being 30° C., and whether there exists generation of stringiness or not was observed. When no stringiness was observed, the resin composition solution was evaluated as ○. When at least one string was observed, it was evaluated as x.

<Evaluation of Coating Film>

(1) Evaluation with Polypropylene

The resin solutions obtained in Examples 1 to 36 were diluted with the same solvent used in the preparation thereof and controlled to have a dropping time of 15±2 seconds by using Ford cup No. 4 at 25° C. Subsequently, the above-described solution was applied by spraying on a square plate made of polypropylene (Sumitomo Mitsui Polyolefin Co., Ltd., product name; J700) having the surface wiped with isopropyl alcohol, such that the film thickness after drying would be 10 μm, and after drying at 80° C. for 20 minutes, a coating film was obtained. With respect to this coating film, the cross-cut peel and tackiness of the coating film surface were evaluated by finger touch. Furthermore, a white topcoat paint was applied on the above-described coating film such that the film thickness after drying would be 20 μm, and the plate was left to stand at room temperature for 10 minutes and was subjected to baking in an oven at 80° C. for 20 minutes to give a coating film. This coating film was subjected to the cross-cut peel test. Also, the weather resistance test was carried out, and the gloss retention after the test and cross-cut peel were evaluated.

Moreover, with respect to Examples 25 to 33, 0.2% of a UV absorber (TINUVIN 327) and 0.2% of an antioxidant (IRGANOX 1330) relative to the resin content were added, respectively, and at the same time, a curing agent was mixed to the amounts described in Examples 16 to 24. Thus, the resin solutions were applied by the above-described method to give coating films. These coating films were subjected to evaluation for the cross-cut peel and tackiness of the coating film surface by finger touch. Also, the weather resistance test was carried out, and the gloss retention after the test and cross-cut peel were evaluated.

(2) Evaluation with Olefinic Thermoplastic Elastomer (Tafmer)

The resin solutions obtained in Examples 1 to 36 were diluted with the same solvent used in the preparation thereof and controlled to have a dropping time of 15±2 seconds by using Ford cup No. 4 at 25° C. Subsequently, the above-described solution was applied by spraying on a square plate made of olefinic thermoplastic elastomer (Mitsui Chemicals, Inc., product name; Tafmer A4070) having the surface wiped with isopropyl alcohol such that the film thickness after drying would be 5 μm, and after drying at 80° C. for 20 minutes, a coating film was obtained. This coating film was subjected to the cross-cut peel test. Furthermore, a white topcoat paint was applied on the above-described coating film such that the film thickness after drying would be 10 μm, and the plate was left to stand at room temperature for 10 minutes and was subjected to baking in an oven at 80° C. for 20 minutes to give a coating film. This coating film was subjected to the cross-cut peel test.

(3) Evaluation with Olefinic Thermoplastic Elastomer (Milastomer)

The resin solutions obtained in Examples 1 to 36 were diluted with the same solvent used in the preparation thereof and controlled to have a dropping time of 15±2 seconds by using Ford cup No. 4 at 25° C. Subsequently, the above-described solution was applied by spraying on a square plate made of olefinic thermoplastic elastomer (Mitsui Chemicals, Inc., product name; Milastomer 8030) having the surface wiped with isopropyl alcohol such that the film thickness after drying would be 5 μm, and after drying at 80° C. for 20 minutes, a coating film was obtained. This coating film was subjected to the cross-cut peel test. Furthermore, a white topcoat paint was applied on the above-described coating film such that the film thickness after drying would be 10 μm, and the plate was left to stand at room temperature for 10 minutes and was subjected to baking in an oven at 80° C. for 20 minutes to give a coating film. This coating film was subjected to the cross-cut peel test.

Here, the topcoat paint used in the above was a mixture of a main agent in which 0.2% of a UV absorber (TINUVIN327) relative to the resin content, 0.2% of an antioxidant (IRGANOX 1330) relative to the resin content, and 30% of a titanium oxide pigment (Tipaque-CR93 (Ishihara Sangyo Co., Ltd., tradename)) relative to the resin content are dispersed in Olester Q186 (Mitsui Chemicals, Inc., tradename, non-volatile content: 50%, hydroxyl value: 30 KOH mg/g), and a curing agent containing NCO, MT Olester NM89-50G (Mitsui Takeda Chemicals, Inc., tradename, non-volatile content: 50%, NCO %: 6%), to the ratio of OH/NCO=0.95.

Cross-Cut Peel Test

According to the cross-cut peel test described in JIS-K-5400, a specimen having grid cell marks was prepared, and Cellotape (registered mark) (Nichiban Co., Ltd.) was adhered on the grid cells and then peeled off by pulling rapidly in the direction of 90°. Evaluation was made by counting the number of unpeeled grid cells among the 100 grid cells.

In addition, for the coating film evaluation item (1), the same evaluation was made by using gummed tape, in addition to Cellotape (registered mark). The cross-cut peel test using the gummed tape was carried out such that the peel test was carried out 10 times on the same place, and the number of unpeeled grid cells was counted. Also, the cross-cut peel test after the weather resistance test was carried out using Cellotape (registered mark) only.

Weather Resistance Test

According to the method of an accelerated weather resistance test as described in JIS-K-5400, evaluation was made by a sunshine carbon arc lamp method. By means of a 60° specular gloss measured after exposure for 500 hours (JIS-K-5400), the retention of the measured value was calculated by the formula: retention (%)=(specular gloss after test)/(initial specular gloss)×100. Those having a gloss retention of 80% or more and no color change were rated ○, those having a gloss retention of 60% or more to less than 80% were rated A and those having a gloss retention of less than 60% were rated x.

<Heat Seal Test>

The resin solutions obtained in Examples 1 to 15, 34 to 36 and Comparative Examples 1 to 6 were diluted with the same solvent used in the preparation thereof to have a non-volatile content of 10%. Subsequently, the above-described solution was applied on aluminum foil with a bar coater such that the film thickness after drying would be 2 μm, dried in the air, and then heated in an air oven set at 200° C. for 20 seconds, to give a uniform and transparent coating foil. This coating foil and a polypropylene sheet (Tohcello Co., Ltd. #500T-T) were heat sealed according to the method of JIS-Z-1707, by applying a pressure of 0.098 MPa at 120° C. for 1 sec, and thus a specimen was obtained. The specimen was cut into rectangles of 15 mm width, and the 180° peel (peel off) test was carried out at room temperature. Those having a peel strength of 1000 g/15 mm or more were rated ○, those having a peel strength of 500 or more to less than 1000 g/15 mm were rated A, and those having a peel strength of less than 500 g/15 mm were rated x.

TABLE 2

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Stability of resin solution | | | ○ | ○ | ○ | ○ | ○ | ○ | ○ | ○ | ○ | ○ | ○ | ○ |
| Sprayability | | | ○ | ○ | ○ | ○ | ○ | ○ | ○ | ○ | ○ | ○ | ○ | ○ |
| Polypropylene | Without topcoat | Cross-cut peel test (Cellotape) | 100 | 100 | 100 | 100 | 100 | 100 | 100 | 100 | 100 | 100 | 100 | 100 |
| | | Cross-cut peel test (gummed tape) | 100 | 100 | 100 | 100 | 100 | 100 | 100 | 100 | 100 | 100 | 100 | 100 |
| | | Coating tack | absent | absent | absent | absent | absent | absent | absent | absent | absent | absent | absent | absent |
| | With topcoat | Cross-cut peel test (Cellotape) | 100 | 100 | 100 | 100 | 100 | 100 | 100 | 100 | 100 | 100 | 100 | 100 |
| | | Cross-cut peel test (gummed tape) | 100 | 100 | 100 | 100 | 100 | 100 | 100 | 100 | 100 | 100 | 100 | 100 |
| | | Gloss retention after weather resistance test | ○ | ○ | ○ | ○ | ○ | ○ | ○ | ○ | ○ | ○ | ○ | ○ |
| | | Cross-cut peel after weather resistance test | 100 | 100 | 100 | 100 | 100 | 100 | 100 | 100 | 100 | 100 | 100 | 100 |
| Tafmer | Without topcoat | Cross-cut peel test | 100 | 100 | 100 | 100 | 100 | 100 | 100 | 100 | 100 | 100 | 100 | 100 |
| | With topcoat | Cross-cut peel test | 100 | 100 | 100 | 100 | 100 | 100 | 100 | 100 | 100 | 100 | 100 | 100 |
| Milastomer | Without topcoat | Cross-cut peel test | 100 | 100 | 100 | 100 | 100 | 100 | 100 | 100 | 100 | 100 | 100 | 100 |
| | With topcoat | Cross-cut peel test | 100 | 100 | 100 | 100 | 100 | 100 | 100 | 100 | 100 | 100 | 100 | 100 |
| Peeling off | | | ○ | ○ | ○ | ○ | ○ | ○ | ○ | ○ | ○ | ○ | ○ | ○ |

| | | | Example | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 |
| Stability of resin solution | | | ○ | ○ | ○ | — | — | — | — | — | — | — | — | — |
| Sprayability | | | ○ | ○ | ○ | ○ | ○ | ○ | ○ | ○ | ○ | ○ | ○ | ○ |
| Polypropylene | Without topcoat | Cross-cut peel test (Cellotape) | 100 | 100 | 100 | 100 | 100 | 100 | 100 | 100 | 100 | 100 | 100 | 100 |
| | | Cross-cut peel test (gummed tape) | 100 | 100 | 100 | 100 | 100 | 100 | 100 | 100 | 100 | 100 | 100 | 100 |
| | | Coating tack | absent | absent | absent | absent | absent | absent | absent | absent | absent | absent | absent | absent |
| | With topcoat | Cross-cut peel test (Cellotape) | 100 | 100 | 100 | 100 | 100 | 100 | 100 | 100 | 100 | 100 | 100 | 100 |

TABLE 2-continued

| | | | | | | | | | | | | | | |
|---|---|---|---|---|---|---|---|---|---|---|---|---|---|---|
| | | Cross-cut peel test (gummed tape) | 100 | 100 | 100 | 100 | 100 | 100 | 100 | 100 | 100 | 100 | 100 | 100 |
| | | Gloss retention after weather resistance test | ○ | ○ | ○ | ○ | ○ | ○ | ○ | ○ | ○ | ○ | ○ | ○ |
| | | Cross-cut peel after weather resistance test | 100 | 100 | 100 | 100 | 100 | 100 | 100 | 100 | 100 | 100 | 100 | 100 |
| Tafmer | Without topcoat | Cross-cut peel test | 100 | 100 | 100 | 100 | 100 | 100 | 100 | 100 | 100 | 100 | 100 | 100 |
| | With topcoat | Cross-cut peel test | 100 | 100 | 100 | 100 | 100 | 100 | 100 | 100 | 100 | 100 | 100 | 100 |
| Milastomer | Without topcoat | Cross-cut peel test | 100 | 100 | 100 | 100 | 100 | 100 | 100 | 100 | 100 | 100 | 100 | 100 |
| | With topcoat | Cross-cut peel test | 100 | 100 | 100 | 100 | 100 | 100 | 100 | 100 | 100 | 100 | 100 | 100 |
| Peel off | | | ○ | ○ | ○ | — | — | — | — | — | — | — | — | — |

TABLE 3

| | | | Example | | | | | | | | | | | |
|---|---|---|---|---|---|---|---|---|---|---|---|---|---|---|
| | | | 25 | 26 | 27 | 28 | 29 | 30 | 31 | 32 | 33 | 34 | 35 | 36 |
| Stability of resin solution | | | — | — | — | — | — | — | — | — | — | ○ | ○ | ○ |
| Sprayability | | | ○ | ○ | ○ | ○ | ○ | ○ | ○ | ○ | ○ | ○ | ○ | ○ |
| Polypropylene | Without topcoat | Cross-cut peel test (Cellotape) | 100 | 100 | 100 | 100 | 100 | 100 | 100 | 100 | 100 | 100 | 100 | 100 |
| | | Cross-cut peel test (gummed tape) | 100 | 100 | 100 | 100 | 100 | 100 | 100 | 100 | 100 | 100 | 100 | 100 |
| | | Coating tack | absent | absent | absent | absent | absent | absent | absent | absent | absent | absent | absent | absent |
| | With topcoat | Cross-cut peel test (Cellotape) | 100 | 100 | 100 | 100 | 100 | 100 | 100 | 100 | 100 | 100 | 100 | 100 |
| | | Cross-cut peel test (gummed tape) | 100 | 100 | 100 | 100 | 100 | 100 | 100 | 100 | 100 | 100 | 100 | 100 |
| | | Gloss retention after weather resistance test | ○ | ○ | ○ | ○ | ○ | ○ | ○ | ○ | ○ | ○ | ○ | ○ |
| | | Cross-cut peel after weather resistance test | 100 | 100 | 100 | 100 | 100 | 100 | 100 | 100 | 100 | 100 | 100 | 100 |
| | curing agent introduced without topcoat | Cross-cut peel test (Cellotape) | 100 | 100 | 100 | 100 | 100 | 100 | 100 | 100 | 100 | — | — | — |
| | | Cross-cut peel test (gummed tape) | 100 | 100 | 100 | 100 | 100 | 100 | 100 | 100 | 100 | — | — | — |
| | | Coating tack | absent | absent | absent | absent | absent | absent | absent | absent | absent | — | — | — |
| | | Gloss retention after weather resistance test | ○ | ○ | ○ | ○ | ○ | ○ | ○ | ○ | ○ | — | — | — |
| | | Cross-cut peel after weather resistance test | 100 | 100 | 100 | 100 | 100 | 100 | 100 | 100 | 100 | — | — | — |
| Tafmer | Without topcoat | Cross-cut peel test | 100 | 100 | 100 | 100 | 100 | 100 | 100 | 100 | 100 | 100 | 100 | 100 |
| | With topcoat | Cross-cut peel test | 100 | 100 | 100 | 100 | 100 | 100 | 100 | 100 | 100 | 100 | 100 | 100 |

TABLE 3-continued

|  |  |  | | | | | | | | | | | | |
|---|---|---|---|---|---|---|---|---|---|---|---|---|---|---|
| Milastomer | Without topcoat | Cross-cut peel test | 100 | 100 | 100 | 100 | 100 | 100 | 100 | 100 | 100 | 100 | 100 | 100 |
|  | With topcoat | Cross-cut peel test | 100 | 100 | 100 | 100 | 100 | 100 | 100 | 100 | 100 | 100 | 100 |  |
| Peel off |  |  | — | — | — | — | — | — | — | — | — | ○ | ○ | ○ |

|  |  |  | Comparative Example | | | | | |
|---|---|---|---|---|---|---|---|---|
|  |  |  | 1 | 2 | 3 | 4 | 5 | 6 |
| Stability of resin solution |  |  | ○ | ○ | ○ | ○ | ○ | ○ |
| Sprayability |  |  | ○ | ○ | ○ | ○ | ○ | ○ |
| Polypropylene | Without topcoat | Cross-cut peel test (Cellotape) | 100 | 100 | 100 | 100 | 100 | 100 |
|  |  | Cross-cut peel test (gummed tape) | 95 | 93 | 95 | 95 | 90 | 97 |
|  |  | Coating tack | present | present | present | slightly present | slightly present | slightly present |
|  | With topcoat | Cross-cut peel test (Cellotape) | 95 | 95 | 100 | 95 | 97 | 100 |
|  |  | Cross-cut peel test (gummed tape) | 90 | 85 | 95 | 90 | 85 | 95 |
|  |  | Gloss retention after weather resistance test | Δ | Δ | Δ | Δ | Δ | Δ |
|  |  | Cross-cut peel after weather resistance test | 95 | 90 | 98 | 90 | 90 | 95 |
| Tafmer | Without topcoat | Cross-cut peel test | 100 | 100 | 100 | 100 | 100 | 100 |
|  | With topcoat | Cross-cut peel test | 97 | 100 | 100 | 97 | 100 | 100 |
| Milastomer | Without topcoat | Cross-cut peel test | 100 | 100 | 100 | 100 | 100 | 100 |
|  | With topcoat | Cross-cut peel test | 100 | 97 | 100 | 97 | 100 | 100 |
| Peel off |  |  | x | x | x | x | x | x |

INDUSTRIAL APPLICABILITY

The paint and primer of the present invention enable spray coating without separation of the resin solution. Further, the coating film formed from the paint and primer of the invention has no tackiness on the coating film surface and exhibits excellent adhesiveness to non-treated polyolefinic resin films, sheets or molded products.

Further, the solvent dispersion of a composite resin of the invention has an effect of excellent heat sealability at low temperatures, which is conventionally not known in the art.

Also, curing agents such as a curing agent having an isocyanate group in the molecule can be used.

The coating film obtained in the invention exhibits superior weather resistance as compared with chlorination-modified polyolefinic coating films.

Furthermore, the invention can be also used as adhesive, additive, binder, film, and primer for strippable paints and traffic paints.

Therefore, the invention is industrially useful.

What we claim is:

1. A solvent dispersion of a composite resin, which comprises a solvent and a composite resin comprising a thermoplastic elastomer (A) and a polymer of copolymerizable monomers (B) consisting of a monomer having an α,β-monoethylenically unsaturated group and other copolymerizable monomer(s), wherein the thermoplastic elastomer (A) is a propylene-based elastomer having a molecular weight distribution (Mw/Mn) of 3 or less as measured by gel permeation chromatography (GPC), and the copolymerizable monomers (B) include at least one monomer containing no functional groups.

2. The solvent dispersion of a composite resin according to claim 1, wherein the solvent is an organic solvent and/or water.

3. The solvent dispersion of a composite resin according to claim 1, wherein the solvent is water and contains basic substance(s).

4. The solvent dispersion of a composite resin according to claim 1, wherein the solvent is water and contains surfactant(s).

5. The solvent dispersion of a composite resin according to claim 1, which is obtained by removing an organic solvent from a solvent dispersion of a composite resin comprising the organic solvent and water as the solvent, and which contains basic substance(s) or surfactant(s).

6. The solvent dispersion of a composite resin according to any one of claims 3 to 5, which comprises water as the solvent, wherein the thermoplastic elastomer (A) and the copolymerizable monomers (B) are present in the same particle.

7. The solvent dispersion of a composite resin according to claim 1, wherein the thermoplastic elastomer (A) has an intrinsic viscosity [η] of 0.1 to 12 dl/g as measured at 135° C. in decalin, and is a propylene-based elastomer (I) which contains (a) 50 to 93 mol % of a unit derived from propylene, (b) 5 to 50 mol % of a unit derived from α-olefin, and (c) 2 to 40 mol % of a unit derived from ethylene, or a propylene-based elastomer (II) which contains (a) 50 to 95 mol % of a unit derived from propylene and (b) 5 to 50 mol % of a unit derived from α-olefin.

8. The solvent dispersion of a composite resin according to claim 1, which is formed by (1) polymerizing the thermoplastic elastomer (A) and the copolymerizable monomers (B) in an organic solvent, (2) polymerizing the thermoplastic elastomer (A) and the copolymerizable monomers (B) and then reacting the resulting polymer under radical generation in an organic solvent, or (3) reacting the thermoplastic elastomer (A) and a polymer (C) composed of the copolymerizable monomers (B) under radical generation in an organic solvent.

9. The solvent dispersion of a composite resin according to claim 1, wherein the weight ratio of the thermoplastic elastomer (A) and the copolymerizable monomers (B) is such that (A)/(B)=10/90 to 90/10.

10. The solvent dispersion of a composite resin according to claim 1, wherein the thermoplastic elastomer (A) used is at least partly modified with a functional group.

11. A coating material containing the solvent dispersion of a composite resin according to claim 1.

12. A primer containing the solvent dispersion of a composite resin according to claim 1.

13. An adhesive containing the solvent dispersion of a composite resin according to claim 1.

14. An additive containing the solvent dispersion of a composite resin according to claim 1.

15. A binder containing the solvent dispersion of a composite resin according to claim 1.

16. A film which is obtained from the solvent dispersion of a composite resin according to claim 1.

17. A coating material which contains a main agent comprising the solvent dispersion of a composite resin according to claim 1 having active hydrogen and/or a hydroxyl group, and a curing agent capable of reacting with the active hydrogen and/or the hydroxyl group.

18. A primer which contains a main agent comprising the solvent dispersion of a composite resin according to claim 1 having active hydrogen and/or a hydroxyl group, and a curing agent capable of reacting with the active hydrogen and/or the hydroxyl group.

19. An adhesive which contains a main agent comprising the solvent dispersion of a composite resin according to claim 1 having active hydrogen and/or a hydroxyl group, and a curing agent capable of reacting with the active hydrogen and/or the hydroxyl group.

20. An additive which contains a main agent comprising the solvent dispersion of a composite resin according to claim 1 having active hydrogen and/or a hydroxyl group, and a curing agent capable of reacting with the active hydrogen and/or the hydroxyl group.

21. A binder which contains a main agent comprising the solvent dispersion of a composite resin according to claim 1 having active hydrogen and/or a hydroxyl group, and a curing agent capable of reacting with the active hydrogen and/or the hydroxyl group.

22. A film which is formed by reacting a main agent comprising the solvent dispersion of a composite resin according to claim 1 having active hydrogen and/or a hydroxyl group with a curing agent capable of reacting with the active hydrogen and/or the hydroxyl group.

23. A coating film which is formed by applying the binder according to claim 15.

24. The solvent dispersion of a composite resin according to claim 4, which comprises water as the solvent, wherein the thermoplastic elastomer (A) and the copolymerizable monomers (B) are present in the same particle.

25. The solvent dispersion of a composite resin according to claim 3, which comprises water as the solvent, wherein the thermoplastic elastomer (A) and the copolymerizable monomers (B) are present in the same particle.

26. A coating film which is formed by applying the additive according to claim 14.

27. A coating film which is formed by applying the adhesive according to claim 13.

28. A coating film which is formed by applying the primer according to claim 12.

29. A coating film which is formed by applying the coating material according to claim 11.

30. A coating film which is formed by curing the binder according to claim 21.

31. A coating film which is formed by curing the additive according to claim 20.

32. A coating film which is formed by curing the adhesive according to claim 19.

33. A coating film which is formed by curing the primer according to claim 18.

34. A coating film which is formed by curing the coating material according to claim 17.

* * * * *